(12) United States Patent
Takenaka et al.

(10) Patent No.: US 8,678,124 B2
(45) Date of Patent: Mar. 25, 2014

(54) INVERTED PENDULUM TYPE VEHICLE

(71) Applicant: Honda Motor Co., Ltd., Tokyo (JP)

(72) Inventors: Toru Takenaka, Saitama (JP); Shinya Shirokura, Saitama (JP); Hideo Murakami, Saitama (JP); Makoto Araki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/777,004

(22) Filed: Feb. 26, 2013

(65) Prior Publication Data

US 2013/0299253 A1  Nov. 14, 2013

(30) Foreign Application Priority Data

May 14, 2012 (JP) ................................. 2012-111052

(51) Int. Cl.
*B62D 11/00* (2006.01)
(52) U.S. Cl.
USPC .............................. 180/220; 180/221; 701/22
(58) Field of Classification Search
USPC .............. 180/7.1, 7.2, 220, 221, 222, 21, 6.2; 301/5.23; 701/22
See application file for complete search history.

(56) References Cited

U.S. PATENT DOCUMENTS

| 8,267,213 B2 * | 9/2012 | Takenaka ...................... 180/222 |
| 2010/0065361 A1 | 3/2010 | Nam et al. |
| 2010/0145576 A1 | 6/2010 | Doi |
| 2011/0071715 A1 | 3/2011 | Akimoto et al. |

FOREIGN PATENT DOCUMENTS

JP        2011-068165 A      4/2011

* cited by examiner

*Primary Examiner* — Keith Frisby
(74) *Attorney, Agent, or Firm* — Carrier Blackman & Associates, P.C.; Joseph P. Carrier; Michael J. McCandlish

(57) ABSTRACT

An inverted pendulum type vehicle includes a first control processor that adds up a basic velocity command in a longitudinal direction and a lateral direction based on an operation through a joystick and a desired center of gravity velocity addition amount in the longitudinal direction and the lateral direction based on the movement of the body weight of the rider, thereby determining a desired velocity. A longitudinal travel velocity command limiter sets a desired center of gravity velocity addition amount, which is based on the basic velocity command based on a longitudinal manipulated variable of the joystick and a center of gravity offset influence amount based on the movement of the body weight of the rider, to a smaller value as a basic turn angular velocity command value increases.

3 Claims, 16 Drawing Sheets

[SETTING MAP OF LONGITUDINAL TRAVEL VELOCITY COMMAND BASED ON MOVEMENT OF BODY WEIGHT]

[SETTING MAP OF LONGITUDINAL TRAVEL VELOCITY COMMAND BASED ON MOVEMENT OF BODY WEIGHT]

[SETTING MAP OF LONGITUDINAL TRAVEL VELOCITY COMMAND BASED ON MOVEMENT OF BODY WEIGHT]

[SETTING MAP OF LONGITUDINAL TRAVEL VELOCITY COMMAND THROUGH JOYSTICK]

[SETTING MAP OF LONGITUDINAL TRAVEL VELOCITY COMMAND THROUGH JOYSTICK]

[SETTING MAP OF LONGITUDINAL TRAVEL VELOCITY COMMAND THROUGH JOYSTICK]

[SETTING MAP OF LATERAL TRAVEL VELOCITY COMMAND BASED ON MOVEMENT OF BODY WEIGHT]

[SETTING MAP OF LATERAL TRAVEL VELOCITY COMMAND BASED ON MOVEMENT OF BODY WEIGHT]

[SETTING MAP OF LATERAL TRAVEL VELOCITY COMMAND BASED ON MOVEMENT OF BODY WEIGHT]

[SETTING MAP OF LATERAL TRAVEL VELOCITY COMMAND BASED ON RESULTANT VELOCITY COMMAND]

[SETTING MAP OF LATERAL TRAVEL VELOCITY COMMAND BASED ON RESULTANT VELOCITY COMMAND]

[SETTING MAP OF LATERAL TRAVEL VELOCITY COMMAND BASED ON RESULTANT VELOCITY COMMAND]

[SETTING MAP OF LATERAL TRAVEL VELOCITY COMMAND BASED ON MOVEMENT OF BODY WEIGHT]

[SETTING MAP OF LATERAL TRAVEL VELOCITY COMMAND BASED ON MOVEMENT OF BODY WEIGHT]

[SETTING MAP OF LATERAL TRAVEL VELOCITY COMMAND BASED ON MOVEMENT OF BODY WEIGHT]

[SETTING MAP OF LATERAL TRAVEL VELOCITY COMMAND BASED ON RESULTANT VELOCITY COMMAND]

[SETTING MAP OF LATERAL TRAVEL VELOCITY COMMAND BASED ON RESULTANT VELOCITY COMMAND]

[SETTING MAP OF LATERAL TRAVEL VELOCITY COMMAND BASED ON RESULTANT VELOCITY COMMAND]

[SETTING MAP OF TURN VELOCITY COMMAND BASED ON LONGITUDINAL VELOCITY]

[SETTING MAP OF TURN VELOCITY COMMAND BASED ON LONGITUDINAL VELOCITY]

[SETTING MAP OF TURN VELOCITY COMMAND BASED ON LONGITUDINAL VELOCITY]

INVERTED PENDULUM TYPE VEHICLE

BACKGROUND OF THE INVENTION

1. Field of the Invention

The present invention relates to an inverted pendulum type vehicle capable of traveling on a floor surface.

2. Description of the Related Art

There has conventionally been known an inverted pendulum type vehicle in which a rider mounting section tiltable relative to the vertical direction is attached to a base body, to which a travel operation unit that travels on a floor surface and an actuator that drives the travel operation unit are installed (refer to, for example, Japanese Patent Application Laid-Open No. 2011-068165).

A rider of the inverted pendulum type vehicle moves the vehicle by moving his/her weight or by operating an operation unit, such as a joystick. It requires, however, a certain level of skill to move the inverted pendulum type vehicle exactly as the rider intends. Hence, it has been difficult for a beginner, who is not experienced with the operation, to operate the inverted pendulum type vehicle as he or she intends.

SUMMARY OF THE INVENTION

The present invention has been made with a view toward overcoming the aforesaid shortcoming, and an object thereof is to provide an inverted pendulum type vehicle which permits an easier traveling operation for a rider.

To this end, an inverted pendulum type vehicle in accordance with the present invention has:

a first travel operation unit capable of traveling on a floor surface;

a first actuator that drives the first travel operation unit;

a base body to which the first travel operation unit and the first actuator are installed; and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator.

Further, the inverted pendulum type according to a first aspect of the invention vehicle includes:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel at least in the lateral direction;

an operation unit which receives, from a rider on the rider mounting section, a longitudinal travel operation instruction for a travel of the inverted pendulum type vehicle in the longitudinal direction, a lateral travel operation instruction for a travel of the inverted pendulum type vehicle in the lateral direction, and a turn operation instruction for making a turn of the inverted pendulum type vehicle;

a velocity command output unit which outputs a longitudinal travel velocity command for causing the inverted pendulum type vehicle to travel in the longitudinal direction at a command velocity based on a manipulated variable of the longitudinal travel operation, a lateral travel velocity command for causing the inverted pendulum type vehicle to travel in the lateral direction at a command velocity based on a manipulated variable of the lateral travel operation, and a turn velocity command for causing the inverted pendulum type vehicle to turn at a command velocity based on a manipulated variable of the turn operation;

a control processing unit which controls the traveling operations of the first travel operation unit and the second travel operation unit by operating the first actuator and the second actuator according to the longitudinal travel velocity command, the lateral travel velocity command, and the turn velocity command; and a longitudinal travel velocity command limiting unit which sets the longitudinal travel velocity command based on the longitudinal travel operation to be lower as the manipulated variable of the turn operation increases while the turn operation and the longitudinal travel operation are being performed through the operation unit.

In the inverted pendulum type vehicle according to the first aspect of the invention, if the manipulated variable of the turn operation increases while the rider on the rider mounting section is performing the turn operation and the longitudinal travel operation through the operation unit, then it is assumed that the rider is trying to further turn the inverted pendulum type vehicle.

Hence, the longitudinal travel velocity command limiting unit sets the longitudinal travel velocity command based on the longitudinal travel operation to be lower as the manipulated variable of the turn operation increases thereby to ensure an easier turn of the inverted pendulum type vehicle, enabling the rider to easily operate the inverted pendulum type vehicle.

Further, the inverted pendulum type vehicle according to the second aspect includes:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel at least in the lateral direction;

an operation unit which receives, from a rider on the rider mounting section, a longitudinal travel operation instruction for a travel of the inverted pendulum type vehicle in the longitudinal direction, a lateral travel operation instruction for a travel of the inverted pendulum type vehicle in the lateral direction, and a turn operation instruction for making a turn of the inverted pendulum type vehicle;

a velocity command output unit which outputs a longitudinal travel velocity command for causing the inverted pendulum type vehicle to travel in the longitudinal direction at a command velocity based on a manipulated variable of the longitudinal travel operation, a lateral travel velocity command for causing the inverted pendulum type vehicle to travel in the lateral direction at a command velocity based on a manipulated variable of the lateral travel operation, and a turn velocity command for causing the inverted pendulum type vehicle to turn at a command velocity based on a manipulated variable of the turn operation;

a control processing unit which controls the traveling operations of the first travel operation unit and the second travel operation unit by operating the first actuator and the second actuator according to the longitudinal travel velocity command, the lateral travel velocity command, and the turn velocity command; and a turn velocity command limiting unit which sets the turn velocity command based on the turn operation to be lower as the manipulated variable of the longitudinal travel operation decreases while the turn operation and the longitudinal travel operation are being performed through the operation unit.

In the inverted pendulum type vehicle according to the second aspect of the invention, if the manipulated variable of the longitudinal travel operation decreases while the rider on the rider mounting section is performing the turn operation and the longitudinal travel operation through the operation unit, then it is assumed that the rider is trying to move the inverted pendulum type vehicle at a low speed.

Hence, the turn velocity command limiting unit sets the turn velocity command based on the turn operation to be lower as the manipulated variable of the longitudinal travel operation decreases. This makes it possible to restrain the inverted pendulum type vehicle from turning at a high speed against the intention of the rider when the rider is trying to move the inverted pendulum type vehicle at a low speed, thus permitting easier operation of the inverted pendulum type vehicle for the rider.

Further, an inverted pendulum type vehicle according to a third aspect of the invention includes:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel at least in the lateral direction;

an operation unit which receives, from a rider on the rider mounting section, a longitudinal travel operation instruction for a travel of the inverted pendulum type vehicle in the longitudinal direction, a lateral travel operation instruction for a travel of the inverted pendulum type vehicle in the lateral direction, and a turn operation instruction for making a turn of the inverted pendulum type vehicle;

a velocity command output unit which outputs a longitudinal travel velocity command for causing the inverted pendulum type vehicle to travel in the longitudinal direction at a command velocity based on a manipulated variable of the longitudinal travel operation, a lateral travel velocity command for causing the inverted pendulum type vehicle to travel in the lateral direction at a command velocity based on a manipulated variable of the lateral travel operation, and a turn velocity command for causing the inverted pendulum type vehicle to turn at a command velocity based on a manipulated variable of the turn operation;

a control processing unit which controls the traveling operations of the first travel operation unit and the second travel operation unit by operating the first actuator and the second actuator according to the longitudinal travel velocity command, the lateral travel velocity command, and the turn velocity command; and a turn velocity command limiting unit which sets the turn velocity command based on the turn operation to be lower as the manipulated variable of the lateral travel operation increases while the turn operation and the lateral travel operation are being performed through the operation unit.

In the inverted pendulum type vehicle according to the third aspect of the invention, the control processing unit may cause the first travel operation unit and the second travel operation unit to travel at the same velocity in the lateral direction in order to cause the inverted pendulum type vehicle to travel in the lateral direction. Alternatively, the control processing unit may cause the first travel operation unit and the second travel operation unit to travel at different velocities in the lateral direction in order to cause the inverted pendulum type vehicle to turn. Hence, the travel velocity of the second travel operation unit is determined on the basis of a resultant velocity of the desired turn velocity and the desired lateral travel velocity.

Accordingly, when the rider on the rider mounting section is performing the turn operation and the lateral travel operation through the operation unit, the turn velocity command limiting unit sets the turn velocity command based on the turn operation to a lower value as the manipulated variable of the lateral travel operation increases. With this arrangement, the turn velocity command is output within the range of the operation limit of the second actuator, prioritizing the lateral travel of the inverted pendulum type vehicle, thus permitting an easier operation for the rider to move the inverted pendulum type vehicle in the lateral direction.

Further, an inverted pendulum type vehicle according to a fourth aspect of the invention includes:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel at least in the lateral direction;

an operation unit which receives, from a rider on the rider mounting section, a longitudinal travel operation instruction for a travel of the inverted pendulum type vehicle in the longitudinal direction, a lateral travel operation instruction for a travel of the inverted pendulum type vehicle in the lateral direction, and a turn operation instruction for making a turn of the inverted pendulum type vehicle;

a velocity command output unit which outputs a longitudinal travel velocity command for causing the inverted pendulum type vehicle to travel in the longitudinal direction at a command velocity based on a manipulated variable of the longitudinal travel operation, a lateral travel velocity command for causing the inverted pendulum type vehicle to travel in the lateral direction at a command velocity based on a manipulated variable of the lateral travel operation, and a turn velocity command for causing the inverted pendulum type vehicle to turn at a command velocity based on a manipulated variable of the turn operation;

a control processing unit which controls the traveling operations of the first travel operation unit and the second travel operation unit by operating the first actuator and the second actuator according to the longitudinal travel velocity command, the lateral travel velocity command, and the turn velocity command; and a lateral travel velocity command limiting unit which sets the lateral travel velocity command to be lower as the manipulated variable of the turn operation increases while the turn operation and the lateral travel operation are being performed through the operation unit.

In the inverted pendulum type vehicle according to the fourth aspect of the invention, the control processing unit may cause the first travel operation unit and the second travel operation unit to travel at the same velocity in the lateral direction in order to cause the inverted pendulum type vehicle to travel in the lateral direction. Alternatively, the control processing unit may cause the first travel operation unit and the second travel operation unit to travel at different velocities in the lateral direction in order to cause the inverted pendulum type vehicle to turn. Hence, the travel velocity of the second travel operation unit is determined on the basis of a resultant velocity of the desired turn velocity and the desired lateral travel velocity.

Accordingly, when the rider on the rider mounting section is performing the turn operation and the lateral travel operation through the operation unit, the lateral travel velocity command limiting unit sets the lateral travel velocity command based on the lateral travel operation to a lower value as the manipulated variable of the turn operation increases. With this arrangement, the lateral travel velocity command is output within the range of the operation limit of the second actuator, prioritizing the turn velocity command, thus permitting an easier operation for the rider to turn the inverted pendulum type vehicle.

DESCRIPTION OF THE PREFERRED EMBODIMENTS

Figure 1:
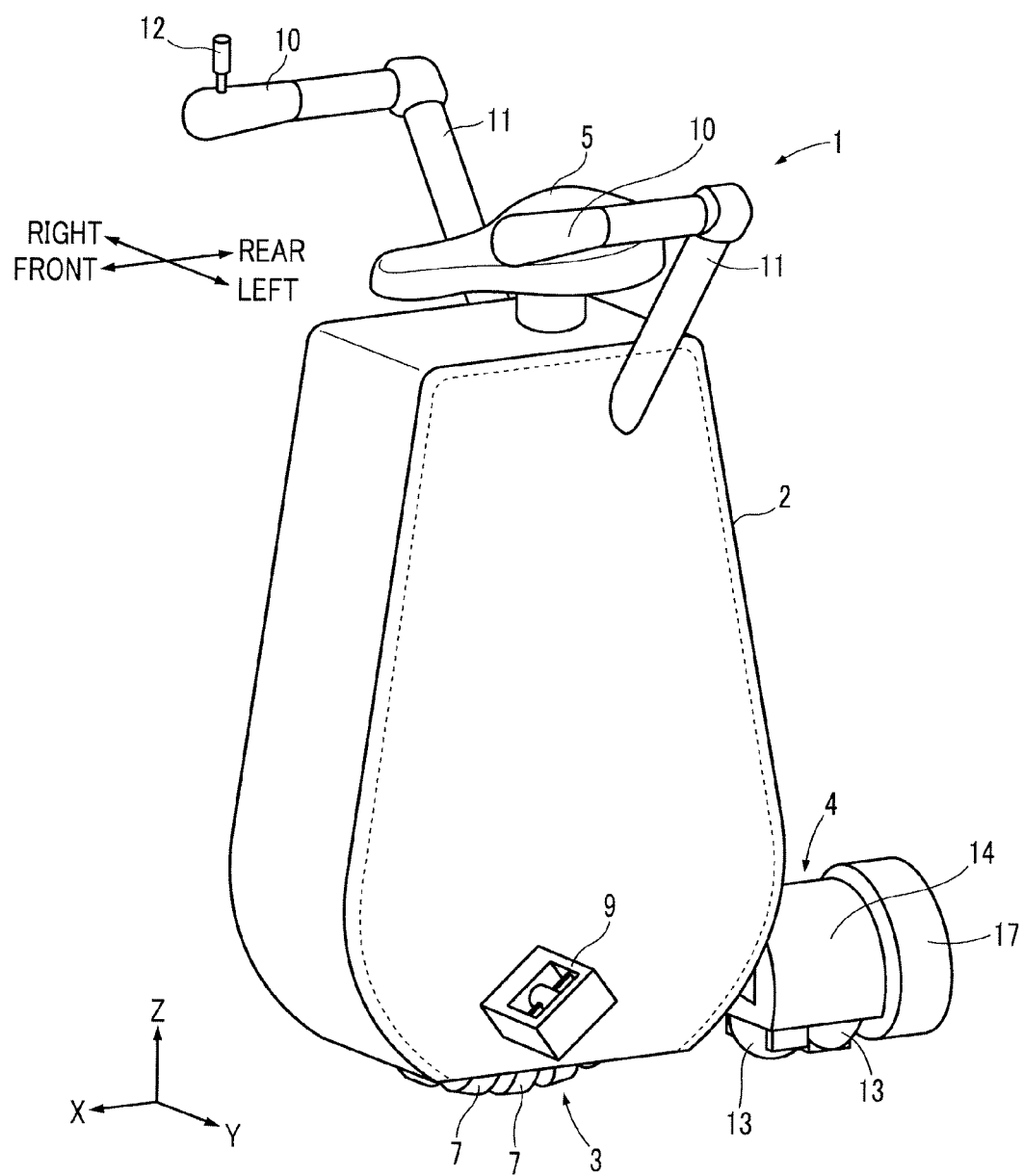
FIG. 1 is a perspective view illustrating the appearance of an inverted pendulum type vehicle according to an embodiment of the present invention.
Figure 2:
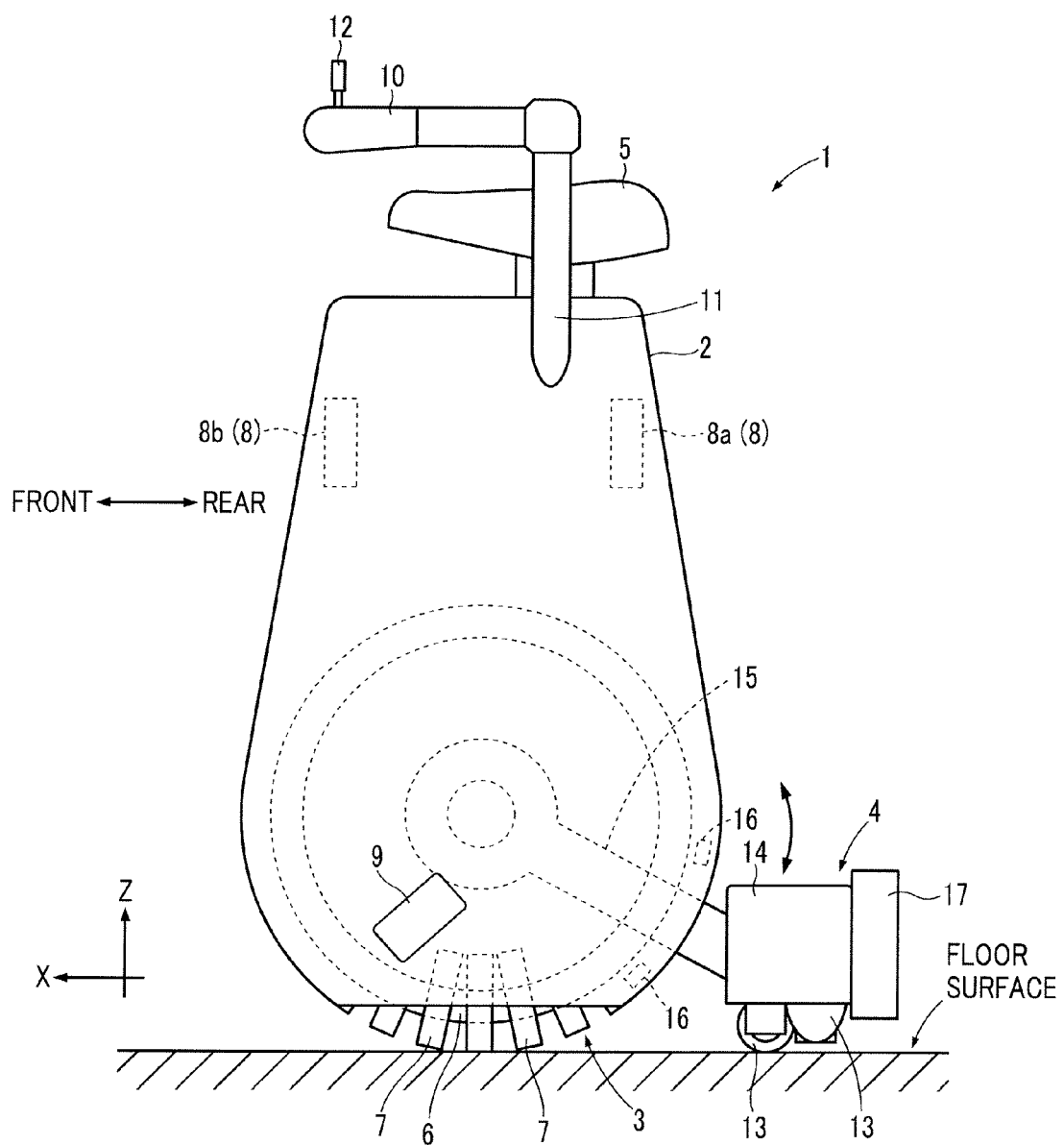
FIG. 2 is a side view of the inverted pendulum type vehicle according to the embodiment.

An embodiment of the present invention will be described with reference to FIG. 1 to FIG. 16C. As illustrated in FIG. 1 and FIG. 2, an inverted pendulum type vehicle 1 according to the present embodiment (hereinafter referred to simply as the vehicle 1 in some cases) has a base body 2, a first travel operation unit 3 and a second travel operation unit 4, which are capable of traveling on a floor surface, and a rider mounting section 5 on which a rider mounts.

The first travel operation unit 3 includes a circular core member 6 shown in FIG. 2 (hereinafter referred to as the annular core member 6) and a plurality of circular rollers 7 mounted on the annular core member 6 such that the circular rollers 7 are arranged at equiangular intervals in the circumferential direction (in the direction about the axial center) of the annular core member 6. Each of the rollers 7 is externally inserted into the annular core member 6 with its rotational axial center directed toward the circumference of the annular core member 6. Further, each of the rollers 7 is configured to be rotatable integrally with the annular core member 6 about the axial center of the annular core member 6. In addition, each of the rollers 7 is configured to be rotatable about the central axis of the cross-sectional plane of the annular core member 6 (the circumferential axis about the axial center of the annular core member 6).

The first travel operation unit 3 having the annular core member 6 and the plurality of the rollers 7 comes in contact with a floor surface through the intermediary of the rollers 7 (the rollers 7 positioned in a lower portion of the annular core member 6), the axial center of the annular core member 6 being directed in parallel to the floor surface. In this ground contact state, the annular core member 6 is rotatively driven about the axial center thereof so as to cause all the annular core member 6 and the rollers 7 to circumrotate. This in turn causes the first travel operation unit 3 to travel on the floor surface in a direction orthogonal to the axial center of the annular core member 6. In the ground contact state, rotatively driving the rollers 7 about their rotational axial centers causes the first travel operation unit 3 to travel in the direction of the axial center of the annular core member 6.

Further, rotatively driving the annular core member 6 and rotatively driving the rollers 7 cause the first travel operation unit 3 to travel in a direction at an angle with respect to the direction orthogonal to the axial center of the annular core member 6 and the direction of the axial center of the annular core member 6.

Thus, the first travel operation unit 3 is capable of traveling on the floor surface in all directions. In the following description, of the traveling directions of the first travel operation unit 3, the direction orthogonal to the axial center of the annular core member 6 is defined as X-axis direction, the direction of the axial center of the annular core member 6 is defined as Y-axis direction, and a vertical direction is defined as Z-axis direction, as illustrated in FIG. 1 and FIG. 2. In addition, a front direction is defined as the positive direction of the X-axis, a left direction is defined as the positive direction of the Y-axis, and an upper direction is defined as a positive direction of the Z-axis.

The first travel operation unit 3 is installed to the base body 2. More specifically, the base body 2 is provided, covering the first travel operation unit 3 except for a lower portion thereof in contact with the floor surface. Further, the base body 2 supports the annular core member 6 of the first travel operation unit 3 such that the annular core member 6 is rotatable about the axial center thereof. In this case, the base body 2 uses the axial center of the annular core member 6 of the first travel operation unit 3 as the supporting point thereof and the base body 2 can be tilted about the axial center (about the Y-axis). Further, the base body 2 is tiltable about the X-axis orthogonal to the axial center of the annular core member 6 by tilting together with the first travel operation unit 3 relative to the floor surface, the ground contact portion of the first travel operation unit 3 being the supporting point. Thus, the base body 2 is tiltable about two axes relative to the vertical direction.

The base body 2 includes therein a first actuator 8, which generates a driving force for moving the first travel operation unit 3, as illustrated in FIG. 2. The first actuator 8 is constituted of an electric motor 8a serving as the actuator that rotatively drives the annular core member 6 and an electric motor 8b serving as the actuator that rotatively drives the rollers 7. The electric motors 8a and 8b impart rotative driving forces to the annular core member 6 and the rollers 7 through the intermediary of a motive power transmitting mechanisms (not shown). The motive power transmitting mechanisms may have publicly known constructions.

The first travel operation unit 3 may have a construction different from the aforesaid construction. For example, the first travel operation unit 3 and the driving system thereof may adopt the constructions proposed by the applicant of the present application in PCT WO/2008/132778 or PCT WO/2008/132779.

Further, the rider mounting section 5 is installed to the base body 2. The rider mounting section 5 is formed of a seat, on which a rider sits, and fixed to the upper end portion of the base body 2. A rider can sit on the rider mounting section 5, the longitudinal direction thereof being the X-axis direction and the lateral direction thereof being the Y-axis direction. The rider mounting section 5 (the seat) is secured to the base body 2, so that the rider mounting section 5 can be tilted integrally with the base body 2 relative to the vertical direction.

Further attached to the base body 2 are a pair of footrests 9 and 9, on which the rider sitting on the rider mounting section 5 places his/her feet, and a pair of handles 10 and 10 held by the rider. The footrests 9 and 9 are protrusively provided in lower portions of both sides of the base body 2. In FIG. 1 and FIG. 2, one (the right one) of the footrests 9 is not shown.

The handles 10 and 10 are formed of bar-like members disposed extendedly in the X-axis direction (the longitudinal direction) on both sides of the rider mounting section 5 and are respectively fixed to the base body 2 through rods 11 extended from the base body 2. Further, a joystick 12 serving as an operation device, which constitutes the operating unit in the present invention, is attached to one handle 10 (the right handle 10 in the drawing) of the pair of handles 10 and 10.

The joystick 12 can be swung in the longitudinal direction (the X-axis direction) and the lateral direction (the Y-axis direction). The joystick 12 outputs an operation signal indicative of the amount of swing in the longitudinal direction (the X-axis direction) as a command for moving the vehicle 1 forward or backward. The joystick 12 also outputs an operation signal indicative of the amount of swing in the lateral direction (the Y-axis direction) as a command for turning the vehicle 1 to the right (clockwise) or the left (counterclockwise), i.e., a turn command.

Regarding the amount of swing of the joystick 12 in the longitudinal direction in the present embodiment, i.e., the amount of rotation about the Y-axis corresponding to the manipulated variable of the longitudinal travel operation in the present invention, the amount of a forward swing is positive, while the amount of a backward swing is negative. Regarding the amount of a lateral swing of the joystick 12, i.e., the amount of rotation about the X-axis corresponding to the manipulated variable of the turning operation in the present invention, the amount of a leftward swing is positive, while the amount of a rightward swing is negative.

The second travel operation unit 4 in the present embodiment is formed of a so-called omniwheel. The omniwheel constituting the second travel operation unit 4 has a publicly known structure, which includes a pair of coaxial annular core members (not shown) and a plurality of barrel-like rollers 13 rotatably and externally inserted in each of the annular core members with the rotational axial centers thereof oriented in the circumferential direction of the annular core member.

In this case, the second travel operation unit 4 is disposed at the rear of the first travel operation unit 3 with the axial centers of the pair of annular core members thereof oriented in the X-axis direction (the longitudinal direction) and is in contact with a floor surface through the rollers 13.

The roller 13 of one of the pair of annular core members and the roller 13 of the other thereof are arranged such that the phases thereof are shifted in the peripheral directions of the annular core members. The rollers 13 are further configured such that either the roller 13 of one of the pair of annular core members or the roller 13 of the other thereof comes in contact with the floor surface when the pair of annular core members rotates.

The second travel operation unit 4 constituted of the omniwheel is joined to the base body 2. More specifically, the second travel operation unit 4 is provided with a housing 14 that covers an upper portion of the omniwheel (all the pair of annular core members and the plurality of the rollers 13). The pair of annular core members of the omniwheel is rotatably supported by the housing 14 such that the pair of annular core members is rotatable about the axial centers thereof. Further, an arm 15 extended from the housing 14 to the base body 2 is rotatably supported by the base body 2 such that the arm 15 is swingable about the axial center of the annular core member 6 of the first travel operation unit 3. Thus, the second travel operation unit 4 is joined to the base body 2 through the arm 15.

Further, the second travel operation unit 4 is swingable, relative to the base body 2, about the axial center of the annular core member 6 of the first travel operation unit 3 by the swing of the arm 15. This allows the rider mounting section 5 to tilt together with the base body 2 about the Y-axis while maintaining both the first travel operation unit 3 and the second travel operation unit 4 to be in contact with the ground.

Alternatively, the arm 15 may be rotatably supported by the axial center portion of the annular core member 6 of the first travel operation unit 3, and the second travel operation unit 4 may be joined to the first travel operation unit 3 through the arm 15.

The base body 2 is provided with a pair of stoppers 16 and 16 that restricts the swing range of the arm 15. Hence, the arm 15 is allowed to swing within the range defined by the stoppers 16 and 16. This restricts the swing range of the second travel operation unit 4 about the axial center of the annular core member 6 of the first travel operation unit 3 and consequently the range of tilt of the base body 2 and the rider mounting section 5 about the X-axis. As a result, the base body 2 and the rider mounting section 5 are prevented from excessively tilting toward the rear side of the rider.

The second travel operation unit 4 may be urged by a spring so as to be pressed against the floor surface.

As described above, the second travel operation unit 4 is capable of traveling on the floor surface in all directions, including the X-axis direction and the Y-axis direction, as with the first travel operation unit 3, by rotating one or both of the pair of annular core members and the rollers 13. More specifically, the rotation of the annular core members enables the second travel operation unit 4 to travel in the Y-axis direction, i.e., the lateral direction. Further, the rotation of the rollers 13 enables the second travel operation unit 4 to travel in the X-axis direction, i.e., the longitudinal direction.

An electric motor 17 serving as the second actuator, which drives the second travel operation unit 4, is attached to the housing 14 of the second travel operation unit 4. The electric motor 17 is joined to the pair of annular core members so as to rotatively drive the pair of annular core members of the second travel operation unit 4.

Thus, according to the present embodiment, the travel of the second travel operation unit 4 in the X-axis direction is adapted to passively follow the travel of the first travel operation unit 3 in the X-axis direction. Further, the travel of the second travel operation unit 4 in the Y-axis direction is implemented by rotatively driving the pair of annular core members of the second travel operation unit 4 by the electric motor 17.

Supplementarily, the second travel operation unit 4 may have the same construction as that of the first travel operation unit 3.

The above has described the mechanical configuration of the vehicle 1 according to the present embodiment.

Figure 3:
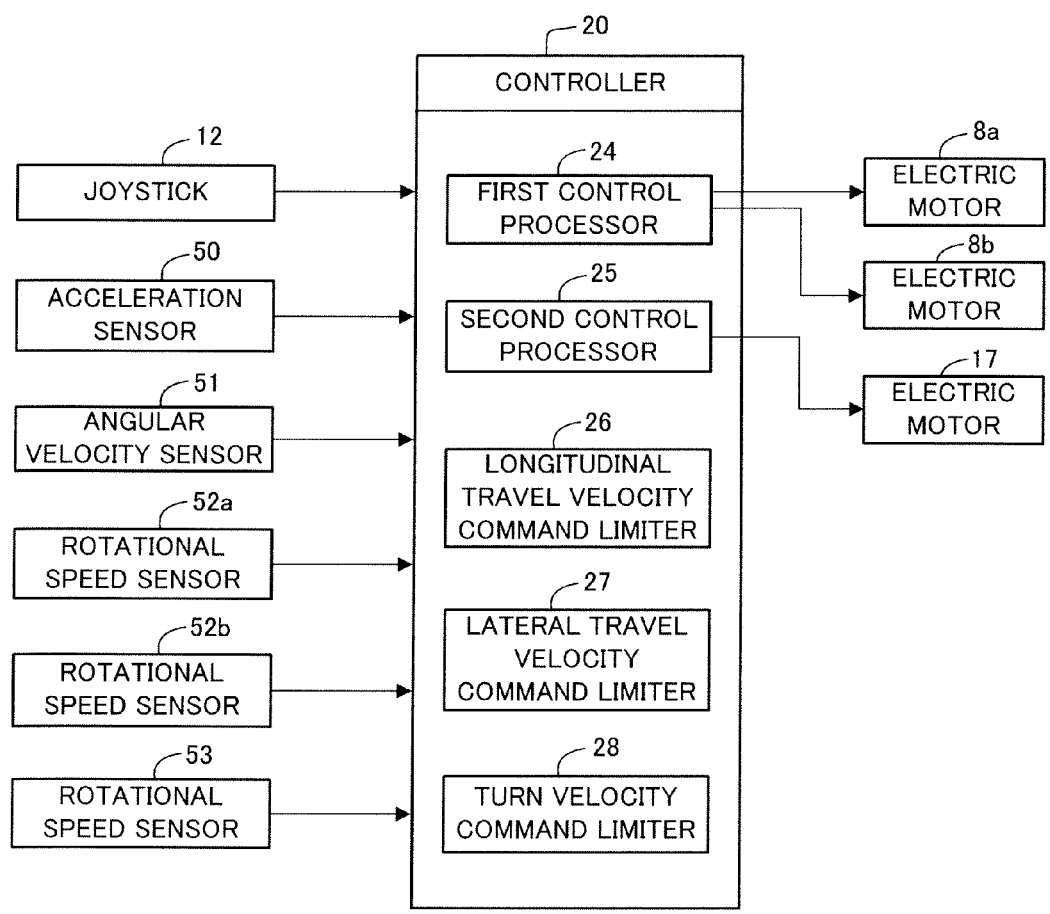
FIG. 3 is a block diagram illustrating the configuration for controlling the inverted pendulum type vehicle according to the embodiment.

Although not shown in FIG. 1 and FIG. 2, in order to control the operation of the vehicle 1, i.e., to control the operations of the first travel operation unit 3 and the second travel operation unit 4, the base body 2 of the vehicle 1 in the present embodiment incorporates a controller 20 constituted of an electronic circuit unit, which includes a CPU, a RAM, a ROM and the like, an acceleration sensor 50 which detects the accelerations in the directions of three axes of the base body 2, an angular velocity sensor 51 (gyro-sensor or the like) which detects the angular velocities about the three axes, a rotational speed sensor 52a (encoder or the like) which detects the rotational speed of the electric motor 8a, a rotational speed sensor 52b which detects the rotational speed of the electric motor 8b, and a rotational speed sensor 53 which detects the rotational speed of the electric motor 17, as illustrated in FIG. 3.

Further, the controller 20 receives outputs of the joystick 12 and detection signals of the acceleration sensor 50, the angular velocity sensor 51, the rotational speed sensor 52a, the rotational speed sensor 52b, and the rotational speed sensor 53.

The controller 20 uses a publicly known method to acquire the measurement value of the tilt angle of the rider mounting section 5, i.e., the tilt angle of the base body 2, from the detection signals of the acceleration sensor 50 and the angular velocity sensor 51. As the method, the one proposed by the applicant of the present application in, for example, Japanese Patent No. 4181113 may be adopted.

More specifically, the tilt angle of the rider mounting section 5 (or the tilt angle of the base body 2) in the present embodiment is the tilt angle (a set of a tilt angle in the direction about the X-axis and a tilt angle in the direction about the Y-axis), which uses, as its reference (zero), the posture of the rider mounting section 5 (or the base body 2) in a state wherein the total center of gravity of the combination of the vehicle 1 and the rider mounted on the rider mounting section 5 in a predetermined posture (standard posture) is positioned right above the ground contact portion of the first travel operation unit 3 (upward in the vertical direction).

Based on a detection signal of the angular velocity sensor 51, the controller 20 acquires the measurement value of the angular velocity of the vehicle 1 about the yaw axis.

To provide a function implemented by an installed program or the like in addition to the function for acquiring the measurement values as described above, the controller 20 further includes a first control processor 24, which controls the electric motors 8a and 8b constituting the first actuator 8 thereby to control the traveling motion of the first travel operation unit 3, a second control processor 25, which controls the electric motor 17 serving as the second actuator thereby to control the traveling motion of the second travel operation unit 4, a longitudinal travel velocity command limiter 26, which limits a velocity command of the travel of the vehicle 1 in the longitudinal direction, a lateral travel velocity command limiter 27, which limits the velocity command of the travel of the vehicle 1 in the lateral direction, and a turn velocity command limiter 28, which limits a turn velocity command of the vehicle 1.

The first control processor 24 carries out the arithmetic processing, which will be discussed hereinafter, to sequentially calculate a first desired velocity, which is the desired value of the travel velocity (more specifically, the set of a translational velocity in the X-axis direction and a translational velocity in the Y-axis direction) of the first travel operation unit 3. Then, the first control processor 24 controls the rotational speed of each of the electric motors 8a and 8b thereby to match the actual travel velocity of the first travel operation unit 3 to the first desired velocity.

In this case, the relationship between the rotational speed of each of the electric motors 8a and 8b and the actual travel velocity of the first travel operation unit 3 is established beforehand. Hence, the desired value of the rotational speed of each of the electric motors 8a and 8b is specified on the basis of the first desired velocity of the first travel operation unit 3.

Then, the first control processor 24 feedback-controls the rotational speeds of the electric motors 8a and 8b to the desired values specified on the basis of the first desired velocity, thereby controlling the actual travel velocity of the first travel operation unit 3 to the first desired velocity.

Further, the second control processor 25 carries out the arithmetic processing, which will be discussed hereinafter, to sequentially calculate a second desired velocity, which is the desired value of the travel velocity (more specifically, the translational velocity in the Y-axis direction) of the second travel operation unit 4. Then, the second control processor 25 controls the rotational speed of the electric motor 17 thereby to match the actual travel velocity of the second travel operation unit 4 in the Y-axis direction to the second desired velocity.

In this case, the relationship between the rotational speed of the electric motor 17 and the actual travel velocity of the second travel operation unit 4 in the Y-axis direction is established beforehand, as with the case of the first travel operation unit 3. Hence, the desired value of the rotational speed of the electric motor 17 is specified on the basis of the second desired velocity of the second travel operation unit 4.

Then, the second control processor 25 feedback-controls the rotational speed of the electric motor 17 to the desired value specified on the basis of the second desired velocity, thereby controlling the actual travel velocity of the second travel operation unit 4 in the Y-axis direction to the second desired velocity.

Supplementarily, according to the present embodiment, the travel of the second travel operation unit 4 in the X-axis direction is passively implemented by following the travel of the first travel operation unit 3 in the X-axis direction. Hence, there is no need to set the desired value of the travel velocity of the second travel operation unit 4 in the X-axis direction.

In the explanation of the embodiments in the present description, the velocity of the first travel operation unit 3 means the moving velocity of the ground contact point of the first travel operation unit 3 unless otherwise specified. Similarly, the velocity of the second travel operation unit 4 means the moving velocity of the ground contact point of the second travel operation unit 4 unless otherwise specified.

The processing by the first control processor 24 and the second control processor 25 will now be described in further detail. First, the processing by the first control processor 24 will be described with reference to FIG. 4 to FIG. 8.

Figure 4:
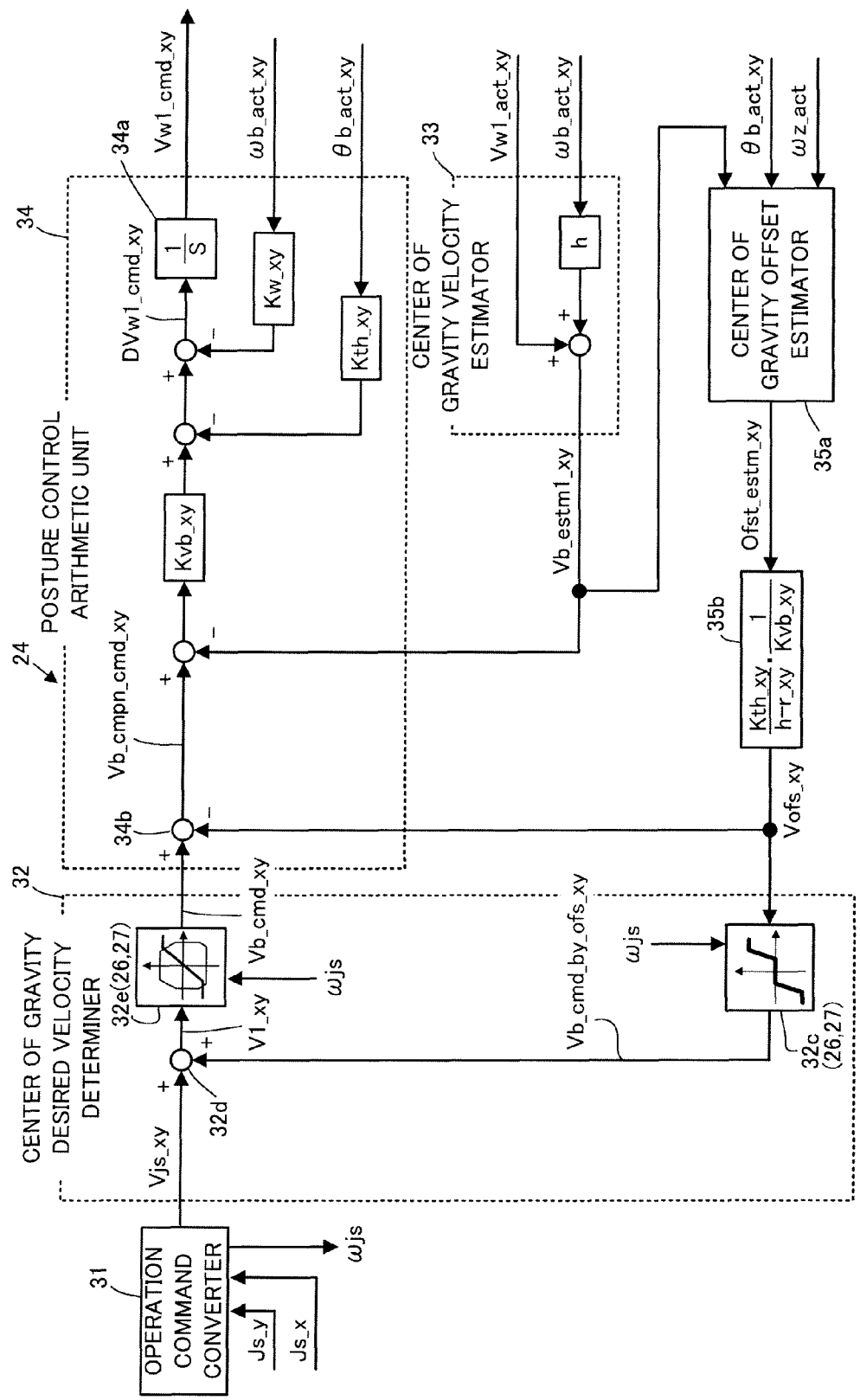
FIG. 4 is a block diagram illustrating the processing by a first control processor shown in FIG. 3.

As illustrated in FIG. 4, the first control processor 24 has, as major functional units thereof, an operation command converter 31 which converts the swing amount of the joystick 12 in the longitudinal direction (the amount of rotation about the Y-axis) Js_x and the swing amount thereof in the lateral direction (the amount of rotation about the X-axis) Js_y, which are indicated by an operation signal input from the joystick 12, into a velocity command for the travel of the vehicle 1, a center of gravity desired velocity determiner 32 which determines the desired velocity of the total center of gravity of the combination of the vehicle 1 and the rider on the rider mounting section 5 (hereinafter referred to as the vehicle system total center of gravity), a center of gravity velocity estimator 33 which estimates the velocity of the vehicle system total center of gravity, and a posture control arithmetic unit 34 which determines the desired value of the travel velocity of the first travel operation unit 3 such that the posture of the rider mounting section 5, i.e., the posture of the base body 2, is stabilized while making the estimated velocity of the vehicle system total center of gravity follow a desired velocity. The first control processor 24 carries out the processing by the aforesaid functional units at a predetermined arithmetic processing cycle of the controller 20.

In the present embodiment, the vehicle system total center of gravity has a meaning as an example of the representative point of the vehicle 1. Accordingly, the velocity of the vehicle system total center of gravity has a meaning as the translational moving velocity of the representative point.

Before specifically describing the processing carried out by each of the functional units of the first control processor 24, the basic matters of the processing will be described. The dynamic behavior of the vehicle system total center of gravity (more specifically, the behavior observed from the Y-axis direction and the behavior observed from the X-axis direction) is approximately expressed by an inverted pendulum model shown in FIG. 5. The algorithm of the processing by the first control processor 24 is created on the basis of the behavior.

In the following description and FIG. 5, a suffix "_x" means a reference code of a variable or the like observed from the Y-axis direction, while a suffix "_y" means a reference code of a variable or the like observed from the X-axis direction. Further, in FIG. 5, the reference codes of the variables observed from the Y-axis direction are not parenthesized, while the reference codes of the variables observed from the X-axis direction are parenthesized in order to illustrate both an inverted pendulum model observed from the Y-axis direction and an inverted pendulum model observed from the X-axis direction.

The inverted pendulum model expressing the behavior of the vehicle system total center of gravity observed from the Y-axis direction has a virtual wheel 61_x which has a rotational axial center parallel to the Y-axis direction and which is circumrotatable on a floor surface (hereinafter referred to as "the virtual wheel 61_x"), a rod 62_x which is extended from the rotational center of the virtual wheel 61_x and which is swingable about the rotational axis of the virtual wheel 61_x (in the direction about the Y-axis direction), and a mass point Ga_x connected to a reference portion Ps_x, which is the distal end portion (upper end portion) of the rod 62_x.

In the inverted pendulum model, it is assumed that the movement of the mass point Ga_x corresponds to the movement of the vehicle system total center of gravity observed from the Y-axis direction, and a tilt angle θb_x (the angle of a tilt in the direction about the Y-axis) of the rod 62_x relative to the vertical direction agrees with the angle of a tilt of the rider mounting section 5 (or the base body 2) in the direction about the Y-axis. Further, the translational movement of the first travel operation unit 3 in the X-axis direction corresponds to the translational movement in the X-axis direction by the circumrotation of the virtual wheel 61_x.

Further, a radius r_x of the virtual wheel 61_x and a height h_x of each of the reference portion Ps_x and the mass point Ga_x from the floor surface are set to predetermined values (fixed values) set beforehand.

Similarly, the inverted pendulum model expressing the behavior of the vehicle system total center of gravity observed from the X-axis direction has a virtual wheel 61_y which has a rotational axial center parallel to the X-axis direction and which is circumrotatable on the floor surface (hereinafter referred to as "the virtual wheel 61_y"), a rod 62_y which is extended from the rotational center of the virtual wheel 61_y and which is swingable about the rotational axis of the virtual wheel 61_y (in the direction about the X-axis direction), and a mass point Ga_y connected to a reference portion Ps_y, which is the distal end portion (upper end portion) of the rod 62_y.

In the inverted pendulum model, it is assumed that the movement of the mass point Ga_y corresponds to the movement of the vehicle system total center of gravity observed from the X-axis direction, and a tilt angle θb_y (the angle of a tilt in the direction about the X-axis) of the rod 62_y relative to the vertical direction agrees with the angle of a tilt of the rider mounting section 5 (or the base body 2) in the direction about the X-axis. Further, the translational movement of the first travel operation unit 3 in the Y-axis direction corresponds to the translational movement in the Y-axis direction by the circumrotation of the virtual wheel 61_y.

Further, a radius r_y of the virtual wheel 61_y and a height h_y of each of the reference portion Ps_y and the mass point Ga_y from the floor surface are set to predetermined values (fixed values) set beforehand. The height h_y of each of the reference portion Ps_y and the mass point Ga_y from the floor surface observed in the X-axis direction is the same as the height h_x of each of the reference portion Ps_x and the mass point Ga_x from the floor surface observed in the Y-axis direction. Hereinafter, therefore, h_x=h_y=h will apply.

The positional relationship between the reference portion Ps_x and the mass point Ga_x observed from the Y-axis direction will be supplementarily described. The position of the reference portion Ps_x corresponds to the position of the vehicle system total center of gravity in the case where it is assumed that the rider mounting (sitting) on the rider mounting section 5 is motionless in a predetermined neutral posture relative to the rider mounting section 5.

In this case, therefore, the position of the mass point Ga_x agrees with the position of the reference portion Ps_x. The same applies to the positional relationship between the reference portion Ps_y and the mass point Ga_y observed from the X-axis direction.

In practice, however, when the rider on the rider mounting section 5 moves his/her upper body or the like relative to the rider mounting section 5 (or the base body 2), the positions of the actual vehicle system total center of gravity in the X-axis direction and the Y-axis direction will usually shift from the positions of the reference portions Ps_x and Ps_y, respectively, in the horizontal direction. For this reason, the positions of the mass points Ga_x and Ga_y, which are shown in FIG. 5, are shifted from the positions of the reference portions Ps_x and Ps_y, respectively.

The behavior of the vehicle system total center of gravity represented by the inverted pendulum model described above is denoted by the following expressions (1a), (1b), (2a) and (2b). In this case, expressions (1a) and (1b) denote the behaviors observed in the Y-axis direction, while expressions (2a) and (2b) denote the behaviors observed in the X-axis direction.

$$Vb\_x = Vw1\_x + h \cdot \omega b\_x \tag{1a}$$

$$dVb\_x/dt = (g/h) \cdot (\theta b\_x \cdot (h - r\_x) + \text{Ofst}\_x) + \omega z \cdot Vb\_y \tag{1b}$$

$$Vb\_y = Vw1\_y + h \cdot \omega b\_y \tag{2a}$$

$$dVb\_y/dt = (g/h) \cdot (\theta b\_y \cdot (h - r\_y) + \text{Ofst}\_y) - \omega z \cdot Vb\_x \tag{2b}$$

where Vb_x denotes the velocity of the vehicle system total center of gravity in the X-axis direction (the translational velocity); θb_x denotes the tilt angle of the rider mounting section 5 (or the base body 2) in the direction about the Y-axis; Vw1_x denotes the moving velocity (the translational velocity) of the virtual wheel 61_x in the X-axis direction; ωb_x denotes the temporal change rate of θb_x (=dθb_x/dt); Ofst_x denotes the amount of a shift of the position of the vehicle system total center of gravity in the X-axis direction (the position of the mass point Ga_x in the X-axis direction) from the position of the reference portion Ps_x in the X-axis direction; Vb_y denotes the velocity of the vehicle system total center of gravity in the Y-axis direction (the translational velocity); Vw1_y denotes the moving velocity (the translational velocity) of the virtual wheel 61_y in the Y-axis direction; θb_y denotes the tilt angle of the rider mounting section 5 (or the base body 2) in the direction about the X-axis; and ωb_y denotes the temporal change rate of θb_y (=dθb_y/dt); and Ofst_y denotes the amount of shift of the position of the vehicle system total center of gravity in the Y-axis direction (the position of the mass point Ga_y in the Y-axis direction) from the position of the reference portion Ps_y in the Y-axis direction. Further, ωz denotes a yaw rate (the angular velocity in the direction about the yaw axis) when the vehicle 1 turns, and g denotes a gravitational acceleration constant.

The positive direction of θb_x and ωb_x is the direction in which the vehicle system total center of gravity tilts in the positive direction of the X-axis (forward), while the positive direction of θb_y and ωb_y is the direction in which the vehicle system total center of gravity tilts in the positive direction of the Y-axis (leftward). Further, the positive direction of ωz is the counterclockwise direction as the vehicle 1 is observed from above.

The second term of the right side of expression (1a), namely, (=h·ωb_x), denotes the translational velocity component of the reference portion Ps_x in the X-axis direction generated by a tilt of the rider mounting section 5 in the direction about the Y-axis. The second term of the right side of expression (2a), namely, (=h·ωb_y), denotes the translational velocity component of the reference portion Ps_y in the Y-axis direction generated by a tilt of the rider mounting section 5 in the direction about the X-axis.

Supplementarily, Vw1_x in expression (1a) specifically denotes a relative circumferential velocity of the virtual wheel 61_x with respect to the rod 62_x (in other words, with respect to the rider mounting section 5 or the base body 2). Hence, Vw1_x includes a velocity component (=r_x·ωb_x), which is generated when the rod 62_x tilts, in addition to the moving velocity of the ground contact point of the virtual wheel 61_x in the X-axis direction relative to the floor surface, i.e., the moving velocity of the ground contact point of the first travel operation unit 3 in the X-axis direction relative to the floor surface. The same applies to Vw1_y in expression (1b).

Further, the first term of the right side of expression (1b) denotes an acceleration component in the X-axis direction generated at the vehicle system total center of gravity by a component in the X-axis direction (F_x in FIG. 5) of a floor reaction force (F in FIG. 5) acting on the ground contact portion of the virtual wheel 61_x according to the amount of shift (=θb_x·(h−r_x)+Ofst_x) of the position of the vehicle system total center of gravity in the X-axis direction (the position of the mass point Ga_x in the X-axis direction) from the vertical upper position of the ground contact portion of the virtual wheel 61_x (the ground contact portion of the first travel operation unit 3 observed from the Y-axis direction). The second term of the right side of expression (1b) denotes the acceleration component in the X-axis direction generated by a centrifugal force acting on the vehicle 1 at the time of turning at the yaw rate of ωz.

Similarly, the first term of the right side of expression (2b) denotes an acceleration component in the Y-axis direction generated at the vehicle system total center of gravity by a component in the Y-axis direction (F_y in FIG. 5) of a floor reaction force (F in FIG. 5) acting on the ground contact portion of the virtual wheel 61_y according to the amount of deviation (=θb_y·(h−r_y)+Ofst_y) of the position of the vehicle system total center of gravity in the Y-axis direction (the position of the mass point Ga_y in the Y-axis direction) from the vertical upper position of the ground contact portion of the virtual wheel 61_y (the ground contact portion of the first travel operation unit 3 observed from the X-axis direction). The second term of the right side of expression (2b) denotes the acceleration component in the Y-axis direction generated by a centrifugal force acting on the vehicle 1 at the time of turning at the yaw rate of ωz.

Figure 6:
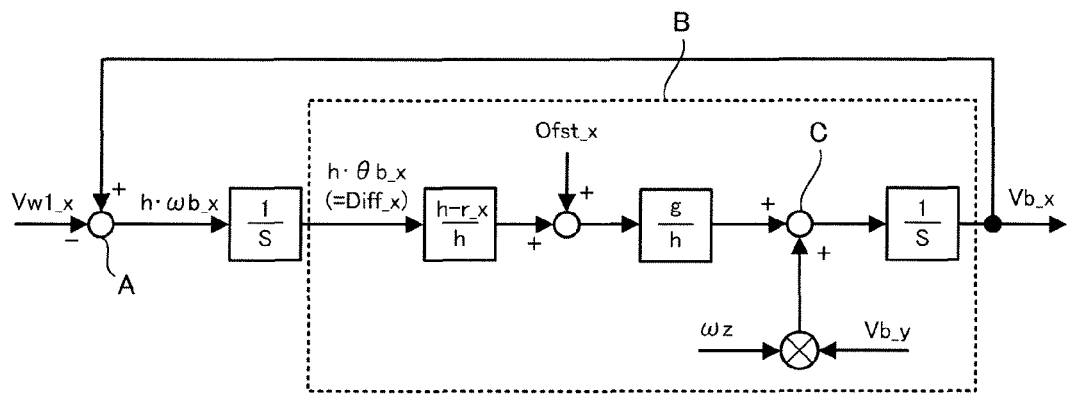
FIG. 6 is a block diagram illustrating behaviors related to the inverted pendulum model shown in FIG. 5.

The behaviors (the behaviors observed in the X-axis direction) represented by expressions (1a) and (1b) described above are illustrated by the block diagram of FIG. 6. In the diagram, 1/s denotes integration operation.

Further, the processing by an arithmetic unit indicated by reference character A in FIG. 6 corresponds to the relational expression of expression (1a), while the processing by an arithmetic unit indicated by reference character B corresponds to the relational expression of expression (1b).

Figure 5:
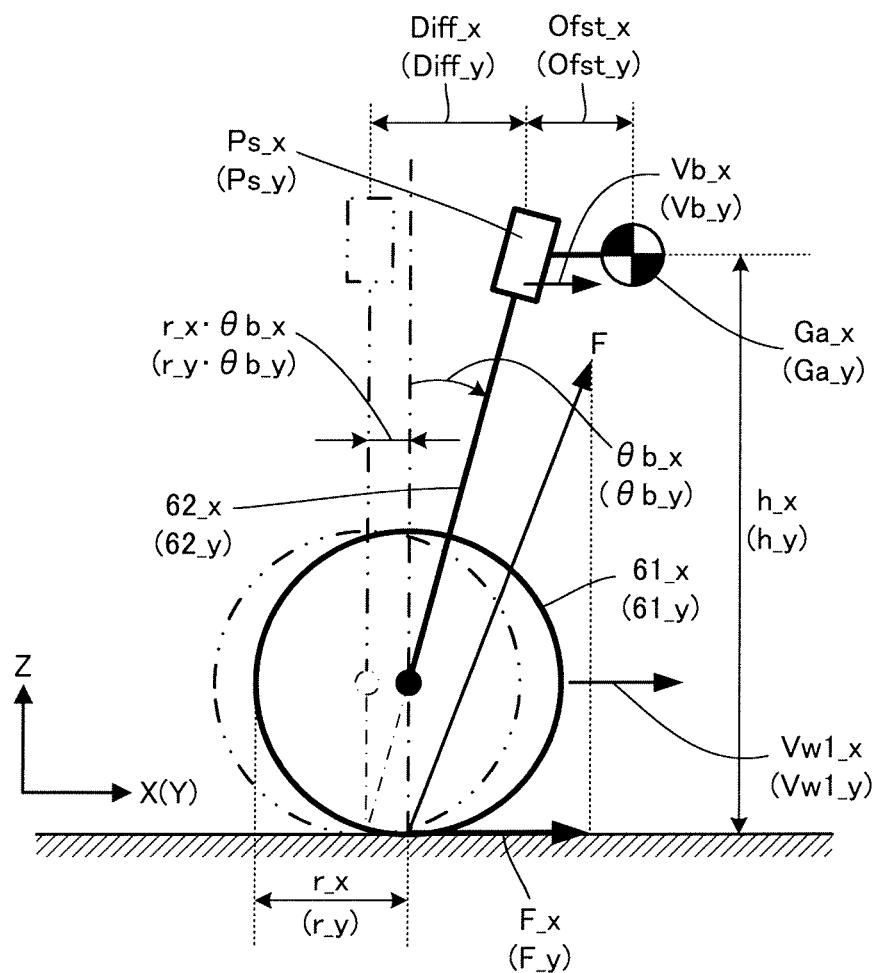
FIG. 5 is a diagram illustrating an inverted pendulum model used for the processing by the first control processor shown in FIG. 3.

In FIG. 6, h·θb_x approximately coincides with Diff_x shown in FIG. 5.

Meanwhile, the block diagram representing the behaviors indicated by expressions (2a) and (2b), i.e., the behaviors observed in the Y-axis direction, is obtained by replacing the suffix "_x" in FIG. 6 by "_y" and by replacing the sign "+" of the acceleration component (the acceleration component generated by the centrifugal force) at the lower side in the drawing, which is one of the inputs to an adder denoted by reference character C, by "−."

According to the present embodiment, the algorithm of the processing by the first control processor 24 is created on the basis of the behavior model (inverted pendulum model) of the vehicle system total center of gravity that considers the centrifugal force and the amount of the shift of the vehicle system total center of gravity from the reference portions Ps_x and Ps_y, as described above.

Based on the above, the processing by the first control processor 24 will be specifically described. In the following description, the set of the value of a variable related to the behavior observed from the Y-axis direction and the value of a variable related to the behavior observed from the X-axis direction will be denoted by adding a suffix "_xy" in some cases.

Referring to FIG. 4, the first control processor 24 first carries out the processing by the operation command converter 31 and the processing by the center of gravity velocity estimator 33 at each arithmetic processing cycle of the controller 20.

Figure 7:
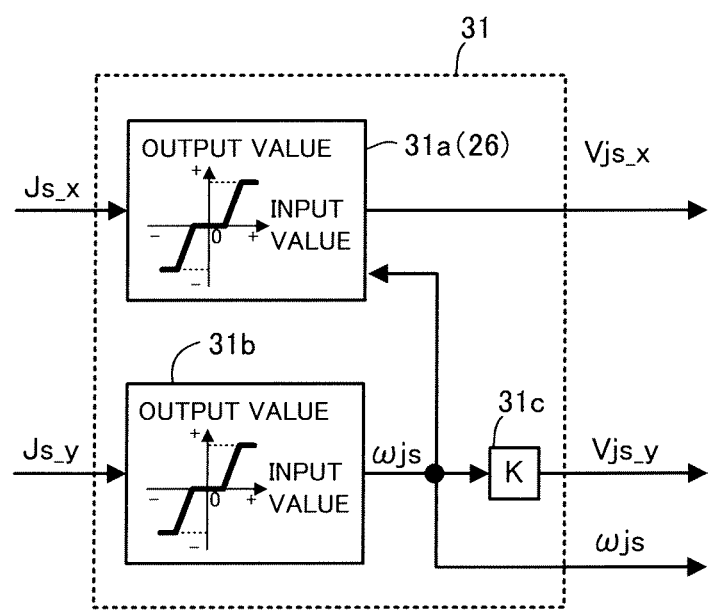
FIG. 7 is a block diagram illustrating the processing an operation command converter shown in FIG. 4.

As illustrated in FIG. 7, the operation command converter 31 determines a basic velocity command Vjs_xy, which is the basic command value of the travel velocity (the translational velocity) of the first travel operation unit 3 and a basic turn angular velocity command ωjs, which is the basic command value of the angular velocity in the direction about the yaw axis when the vehicle 1 turns, on the basis of the amount of swing of the joystick 12 in the Y-axis direction (i.e., the amount of rotation about the X-axis) Js_y and the amount of swing of the joystick 12 in the X-axis direction (i.e., the amount of rotation about the Y-axis) Js_x.

Of the aforesaid basic velocity command Vjs_xy, the basic velocity command Vjs_x in the X-axis direction is determined by a processor 31a on the basis of the amount of swing of the joystick 12 in the X-axis direction Js_x. More specifically, if the amount of swing Js_x is an amount of swing in the positive direction (an amount of a forward swing), then the basic velocity command in the X-axis direction Vjs_x will be a velocity command for a forward movement direction of the vehicle 1 (a positive velocity command). Further, if the amount of swing Js_x is an amount of swing in the negative direction (an amount of a backward swing), then the basic velocity command in the X-axis direction Vjs_x will be a velocity command for a backward movement direction of the vehicle 1 (a negative velocity command).

In this case, the magnitude of the basic velocity command in the X-axis direction Vjs_x is determined such that it increases to a predetermined upper limit value or less as the magnitude of the amount of swing of the joystick 12 in the X-axis direction (the forward or the backward direction) Js_x increases.

A predetermined range in which the magnitude of a swing amount of the joystick 12 in the positive direction or the negative direction Js_x is sufficiently small may be defined as a dead zone, and the basic velocity command in the X-axis direction Vjs_x may be set to zero for a swing amount in the dead zone. The graph shown in the processor 31a in FIG. 7 indicates the relationship between an input (Js_x) and an output (Vjs_x) in the case where the dead zone is involved.

Of the basic velocity commands Vjs_xy, the basic velocity command Vjs_y in the Y-axis direction is determined as the velocity command in the Y-axis direction of the first travel operation unit 3 for a turn of the vehicle 1 on the basis of the a swing amount of the joystick 12 in the Y-axis direction Js_y. More specifically, if the swing amount Js_y is a swing amount in the negative direction (a rightward swing amount), then the basic velocity command Vjs_y in the Y-axis direction will be a leftward velocity command (a positive velocity command) of the vehicle 1. Further, if the swing amount Js_y is a swing amount in the positive direction (a leftward swing amount), then the basic velocity command Vjs_y in the Y-axis direction will be the rightward velocity command (a negative velocity command) of the vehicle 1. In this case, the magnitude of the basic velocity command in the Y-axis direction Vjs_y is determined such that it increases to a predetermined upper limit value or less as the magnitude of the swing amount of the joystick 12 in the Y-axis direction (rightward or leftward) increases.

More specifically, as illustrated in, for example, FIG. 7, the basic turn angular velocity command ωjs, which is the basic command value of the angular velocity in the direction about the yaw axis when the vehicle 1 turns, is determined on the basis of the swing amount of the joystick 12 in the Y-axis direction Js_y by the processing carried out by a processor 31b. In this case, if the swing amount of the joystick 12 Js_y is a swing amount in the negative direction (the rightward swing amount), then the basic turn angular velocity command ωjs will be an angular velocity command of a right-hand (clockwise) turn, i.e., a negative angular velocity command. If the swing amount of the joystick 12 Js_y is a swing amount in the positive direction (leftward swing amount), then the basic turn angular velocity command ωjs will be an angular velocity command of a left-hand (counterclockwise) turn, i.e., a positive angular velocity command. In this case, the magnitude of the basic turn angular velocity command ωjs is determined such that it increases to a predetermined upper limit value or less as the magnitude of the swing amount of the joystick 12 in the Y-axis direction increases.

Further, a processor 31c determines the basic velocity command in the Y-axis direction Vjs_y of the first travel operation unit 3 by multiplying the aforesaid basic turn angular velocity command ωjs by a negative value K, which is (−1) times a predetermined value (>0) set beforehand as the distance in the X-axis direction between an instantaneous turn center of the vehicle 1 and the ground contact point of the first travel operation unit 3.

Hence, the basic velocity command in the Y-axis direction Vjs_y of the first travel operation unit 3 is determined such that it is proportional to the basic turn angular velocity command ωjs, which is determined on the basis of the swing amount in the Y-axis direction Js_y of the joystick 12.

Alternatively, however, regarding the magnitude of the basic velocity command Vjs_y or the basic turn angular velocity command ωjs, a predetermined range in which the magnitude of a swing amount of the joystick 12 in the Y-axis direction is sufficiently small may be defined as a dead zone, and the basic velocity command in the Y-axis direction Vjs_y or the basic turn angular velocity command ωjs may be set to zero in the case of a swing amount falling in the dead zone. The graph given in the processor 31b in FIG. 7 indicates the relationship between inputs (Js_y) and outputs (ωjs) in the case where the dead zone is involved.

If the joystick 12 is operated in both the X-axis direction (the longitudinal direction) and the Y-axis direction (the lateral direction), then the magnitude of the basic velocity command in the Y-axis direction Vjs_y may be set so as to change according to the swing amount of the joystick 12 in the X-axis direction or the basic velocity command in the X-axis direction Vjs_x.

In the present embodiment, the state in which the basic turn angular velocity command ωjs (or the basic velocity command in the Y-axis direction Vjs_y) determined on the basis of the swing operation of the joystick 12 in the Y-axis direction (the lateral direction) is not zero corresponds to a state in which a turn command has been output from the joystick 12. Further, a state in which ωjs (or Vjs_y) is zero corresponds to a state in which the turn command has not been output from the joystick 12.

The longitudinal travel velocity command limiter 26 carries out, by the processor 31a, processing for limiting the basic velocity command in the X-axis direction (the longitudinal direction) Vjs_x, which is determined on the basis of the swing amount Js_x (corresponding to the manipulated variable of the longitudinal travel operation in the present invention) of the joystick 12. The longitudinal travel velocity command limiter 26 changes the basic velocity command Vjs_x in relation to the swing amount Js_x on the basis of the basic turn angular velocity command ωjs according to the setting map of the basic velocity command Vjs_x (output) in relation to the swing amount Js_x (input) of the joystick 12 shown in FIG. 11A to FIG. 11C.

Figure 11A:
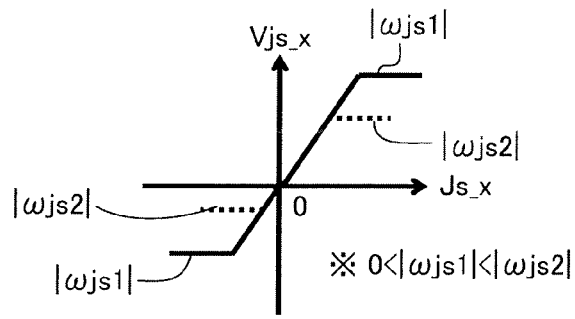
FIG. 11A is an explanatory chart of the setting map for the longitudinal travel velocity command based on a joystick.
Figure 11B:
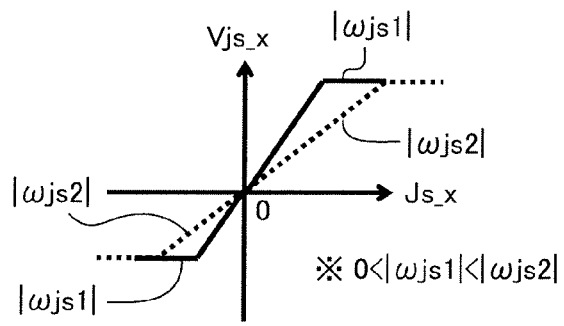
FIG. 11B is an explanatory chart of the setting map for the longitudinal travel velocity command based on the joystick.
Figure 11C:
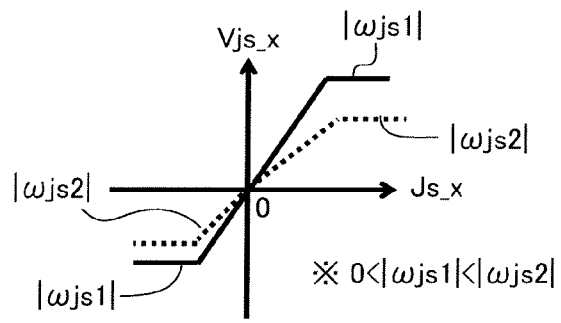
FIG. 11C is an explanatory chart of the setting map for the longitudinal travel velocity command based on the joystick.

According to the setting map shown in one of FIG. 11A to FIG. 11C, the longitudinal travel velocity command limiter 26 sets the basic velocity command Vjs_x output with respect to the input of the swing amount Js_x of the joystick 12 to be lower as the basic turn angular velocity command ωjs increases. For example, in the setting map of FIG. 11C, Vjs_x with respect to the same Js_x is set to become lower at |ωjs2| than at |ωjs1| (<|ωjs2|) throughout the range.

This arrangement allows the vehicle 1 to easily turn by maintaining a low velocity of the vehicle 1 in the longitudinal direction thereby to enable the rider to easily accomplish the turning operation of the vehicle 1 when the basic turn angular velocity command ωjs is high and the rider is performing an operation for making a quick turn.

The center of gravity velocity estimator 33 calculates an estimated value of the velocity of the vehicle system total center of gravity Vb_estm1_xy according to the geometric (dynamic) relationship expressions given by the aforesaid expressions (1a) and (2a) in the inverted pendulum model.

More specifically, as illustrated by the block diagram in FIG. 4, the value of an actual translational velocity Vw1_act_xy of the first travel operation unit 3 and the value, which is obtained by multiplying an actual temporal change rate (tilt angular velocity) ωb_act_xy of a tilt angle θb_xy of the rider mounting section 5 by a height h of the vehicle system total center of gravity are added up to calculate the estimated value of the velocity of the vehicle system total center of gravity Vb_estm1_xy.

More specifically, the estimated value of the velocity in the X-axis direction Vb_estm1_x of the vehicle system total center of gravity and the estimated value of the velocity in the Y-axis direction Vb_estm1_y thereof are calculated according to the following expressions (3a) and (3b).

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the offset amount Ofst_xy of the position of the vehicle system total center of gravity from the position of the reference portion Ps_xy (hereinafter referred to as the center of gravity offset amount Ofst_xy) is set to be sufficiently smaller than Vb_estm1_xy so as to be ignorable.

In this case, according to the present embodiment, desired values of the travel velocity Vw1_cmd_x and Vw1_cmd_y (previous values) of the first travel operation unit 3 determined by the posture control arithmetic unit 34 at the previous arithmetic processing cycle are used as the values of Vw1_act_x and Vw1_act_y in the above calculation.

Alternatively, however, the rotational speeds of the electric motors 8a and 8b, for example, may be detected by the rotational velocity sensors 52a and 52b, and the latest values of Vw1_act_x and Vw1_act_y (i.e., the latest values of the measurement values of Vw1_act_x and Vw1_act_y) estimated from the detection values may be used for the calculation of expressions (3a) and (3b).

Further, according to the present embodiment, the latest values of the temporal change rates of the measurement values of the tilt angle θb of the rider mounting section 5 based on a detection signal of the acceleration sensor 50 and the angular velocity sensor 51 (i.e., the latest values of the measurement values of ωb_act_x and ωb_act_y) are used as the values of ωb_act_x and ωb_act_y.

After carrying out the processing by the operation command converter 31 and the center of gravity velocity estimator 33 as described above, the first control processor 24 carries out the processing by a center of gravity offset estimator 35a illustrated in FIG. 4 so as to determine a center of gravity offset amount estimated value Ofst_estm_xy, which is the estimated value of the center of gravity offset amount Ofst_xy.

Figure 8:
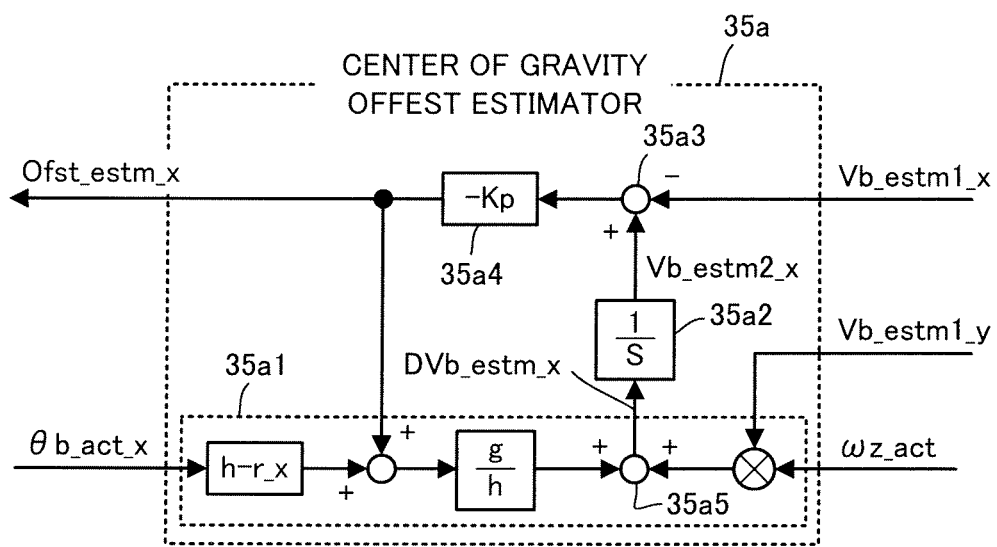
FIG. 8 is a block diagram illustrating the processing by a center of gravity offset estimator shown in FIG. 4.

The processing by the center of gravity offset estimator 35a is the processing indicated by the block diagram of FIG. 8. FIG. 8 representatively illustrates the processing for determining the estimated value of the center of gravity offset amount in the X-axis direction Ofst_estm_x of the estimated value of the center of gravity offset amount Ofst_estm_xy.

The processing in FIG. 8 will be specifically described. The center of gravity offset estimator 35a carries out the arithmetic processing of the right side of the aforesaid expression (1b) by an arithmetic unit 35a1 to calculate an estimated value of the translational acceleration of the vehicle system total center of gravity in the X-axis direction DVb_estm_x by using the measurement value (a latest value) of an actual tilt angle in the direction about the Y-axis θb_act_x of the rider mounting section 5 obtained from the detection signals of the acceleration sensor 50 and the angular velocity sensor 51, the measurement value (a latest value) of an actual yaw rate ωz_act of the vehicle 1 obtained from a detection signal of the angular velocity sensor 51, a first estimated value (a latest value) of the velocity of the vehicle system total center of gravity in the Y-axis direction Vb_estm1_y calculated by the center of gravity velocity estimator 33, and the estimated value of the center of gravity offset amount in the X-axis direction Ofst_estm_x (a previous value) determined at the previous arithmetic processing cycle.

The center of gravity offset estimator 35a further carries out the processing for integrating the estimated value of the translational acceleration in the X-axis direction DVb_estm_x of the vehicle system total center of gravity by an arithmetic unit 35a2 thereby to calculate a second estimated value of the velocity of the vehicle system total center of gravity in the X-axis direction Vb_estm2_x.

Subsequently, the center of gravity offset estimator 35a carries out the processing for calculating the difference between the second estimated value of the velocity of the vehicle system total center of gravity in the X-axis direction Vb_estm2_x (a latest value) and the first estimated value Vb_estm1_x (a latest value) thereof by an arithmetic unit 35a3.

Then, the center of gravity offset estimator 35a further carries out the processing for multiplying the difference by a gain (−Kp) of a predetermined value by an arithmetic unit 35a4 so as to determine the latest value of the estimated value of the center of gravity offset amount in the X-axis direction Ofst_estm_x.

The processing for determining the estimated value of the center of gravity offset amount in the Y-axis direction is also carried out in the same manner described above. More specifically, the block diagram illustrating the determination processing can be obtained by replacing the suffix "_x" in FIG. 8 by "_y" and by replacing the sign "+" of the acceleration component (an acceleration component generated by a centrifugal force) at right in the drawing, which is one of the inputs to an adder 35a5 included in the arithmetic unit 35a1, by "−".

Sequentially updating the estimated value of the center of gravity offset amount Ofst_estm_xy by the aforesaid processing carried out by the center of gravity offset estimator 35a makes it possible to converge Ofst_estm_xy to an actual value.

The first control processor 24 then carries out the processing by a center of gravity offset influence amount calculator 35b shown in FIG. 4 to calculate a center of gravity offset influence amount Vofs_xy.

The center of gravity offset influence amount Vofs_xy indicates the deviation of an actual center of gravity velocity from a desired velocity of the vehicle system total center of gravity in the case where the feedback control is conducted in the posture control arithmetic unit 34, which will be discussed hereinafter, without considering the deviation of the position of the vehicle system total center of gravity from the position of the reference portion Ps_xy in the inverted pendulum mode.

To be specific, the center of gravity offset influence amount calculator 35b multiplies each component of a newly determined estimated value of the center of gravity offset amount Ofst_estm_xy by a value denoted by (Kth_xy/(h_r_xy))/Kvb_xy, thereby calculating the center of gravity offset influence amount Vofs_xy.

Kth_xy denotes a gain value for determining a manipulated variable component which functions to bring the tilt angle of the rider mounting section 5 close to zero, i.e., to a desired tilt angle, in the processing by the posture control arithmetic unit 34, which will be hereinafter discussed. Further, Kvb_xy denotes a gain value for determining a manipulated variable component which functions to bring the difference between a desired velocity of the vehicle system total center of gravity Vb_cmd_xy and the first estimated value of the velocity of the vehicle system total center of gravity Vb_estm1_xy close to zero in the processing carried out by the posture control arithmetic unit 34, which will be hereinafter discussed.

The first control processor 24 then carries out the processing by the center of gravity desired velocity determiner 32 shown in FIG. 4 so as to calculate a restricted center of gravity desired velocity Vb_cmd_xy on the basis of the basic velocity command Vjs_xy determined by the operation command converter 31 and the center of gravity offset influence amount Vofs_xy determined by the center of gravity offset influence amount calculator 35b.

The center of gravity desired velocity determiner 32 first carries out the processing through a processor 32c shown in FIG. 4. The processor 32c carries out dead-zone processing and limiting related to the value of the center of gravity offset influence amount Vofs_xy thereby to determine a desired center of gravity velocity addition amount Vb_cmd_by_ofs_xy as a component based on the center of gravity offset of a desired value of the vehicle system total center of gravity.

More specifically, according to the present embodiment, if the magnitude of the center of gravity offset influence amount in the X-axis direction Vofs_x is a value within a dead zone, which is a predetermined range in the vicinity of zero, i.e., a value that is relatively close to zero, then the center of gravity desired velocity determiner 32 sets the desired center of gravity velocity addition amount in the X-axis direction Vb_cmd_by_ofs_x to zero.

Further, if the magnitude of the center of gravity offset influence amount in the X-axis direction Vofs_x is a value that deviates from the dead zone, then the center of gravity desired velocity determiner 32 determines the desired center of gravity velocity addition amount in the X-axis direction Vb_cmd_by_ofs_x such that the polarity thereof is the same as Vofs_x and the magnitude thereof increases as the magnitude of Vofs_x increases. However, the value of the desired center of gravity velocity addition amount Vb_cmd_by_ofs_x is restricted to the range from a predetermined upper limit value (>0) to a predetermined lower limit value (≤0).

The processing for determining the desired center of gravity velocity addition amount in the Y-axis direction Vb_cmd_by_ofs_y is the same as the processing described above.

The configuration for determining the amount of the center of gravity offset influence resulting from the shift of the rider's body weight (the manipulated variables of the velocity command operations in the longitudinal direction and the lateral direction accrued by the shift of the rider's body weight) by the center of gravity velocity estimator 33, the center of gravity offset estimator 35a and the center of gravity offset influence amount calculator 35b corresponds to the function of the operation unit in the present invention, and the configuration combined with the joystick 12 constitutes the operation unit in the present invention.

The longitudinal travel velocity command limiter 26 carries out, in the processor 32c, the processing for limiting a desired center of gravity velocity addition amount in the X-axis direction (the longitudinal direction) Vb_cmd_by_ofs_x, which is determined on the basis of the center of gravity offset influence amount Vofs_x (corresponding to the velocity command based on the shift of the body weight in the X-axis direction and the manipulated variable of the longitudinal travel operation in the present invention).

Figure 10A:
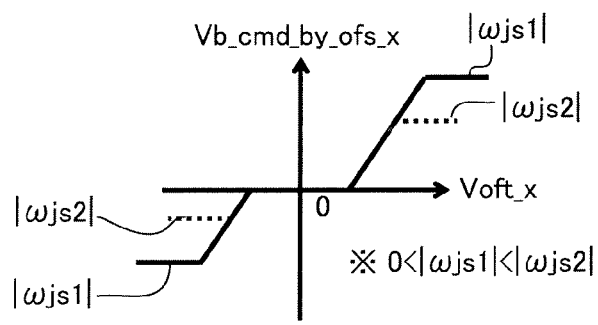
FIG. 10A is an explanatory chart of the setting map for a longitudinal travel velocity command based on the movement of a body weight.
Figure 10B:
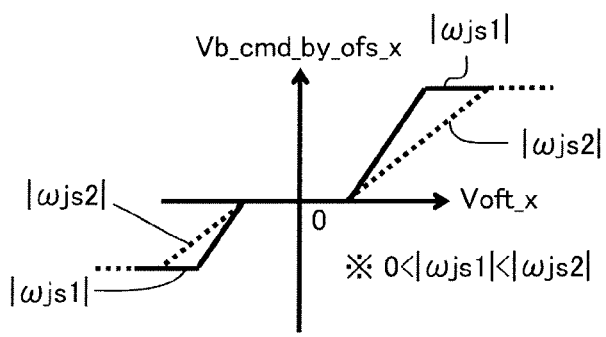
FIG. 10B is an explanatory chart of the setting map for the longitudinal travel velocity command based on the movement of a body weight.
Figure 10C:
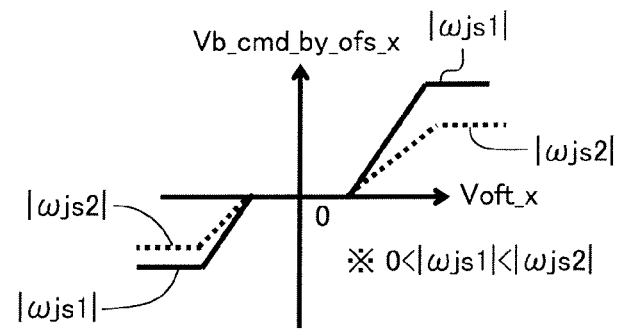
FIG. 10C is an explanatory chart of the setting map for the longitudinal travel velocity command based on the movement of a body weight.

The longitudinal travel velocity command limiter 26 changes the desired center of gravity velocity addition amount Vb_cmd_by_ofs_x with respect to the center of gravity offset influence amount Vofs_x on the basis of the basic turn angular velocity command ωjs according to the setting map of the desired center of gravity velocity addition amount Vb_cmd_by_ofs_x (output) with respect to the center of gravity offset influence amount Vofs_x (input) illustrated in FIG. 10A to FIG. 10C.

According to the setting maps in FIG. 10A to FIG. 10C, the longitudinal travel velocity command limiter 26 sets the desired center of gravity velocity addition amount Vb_cmd_by_ofs_x output with respect to the input of the center of gravity offset influence amount Vofs_x to a smaller value as the basic turn angular velocity command ωjs increases. For example, in the setting map of FIG. 10C, Vb_cmd_by_ofs_x with respect to the same Vost_x is set to become lower at |ωjs2| than at |ωjs1| (<|ωjs2|) throughout the range excluding a dead zone.

This arrangement allows the vehicle 1 to easily turn by maintaining a low velocity of the vehicle 1 in the longitudinal direction thereby to enable the rider to easily accomplish the turning operation of the vehicle 1 when the basic turn angular velocity command ωjs is high and the rider is performing an operation for making a quick turn.

Further, the lateral travel velocity command limiter 27 carries out, by the processor 32c, the processing for limiting the desired center of gravity velocity addition amount in the Y-axis direction (the lateral direction) Vb_cmd_by_ofs_y, which is determined on the basis of the center of gravity offset influence amount Vofs_y (corresponding to the velocity command based on the shift of the body weight in the Y-axis direction and the manipulated variable of the lateral travel operation in the present invention).

The lateral travel velocity command limiter 27 changes the desired center of gravity velocity addition amount Vb_cmd_by_ofs_y with respect to the center of gravity offset influence amount Vofs_y on the basis of the basic turn angular velocity command ωjs according to the setting map of the desired center of gravity velocity addition amount Vb_cmd_by_ofs_y (output) with respect to the center of gravity offset influence amount Vofs_y (input) shown in FIG. 12A to FIG. 12C and FIG. 14A to FIG. 14C.

Figure 12A:
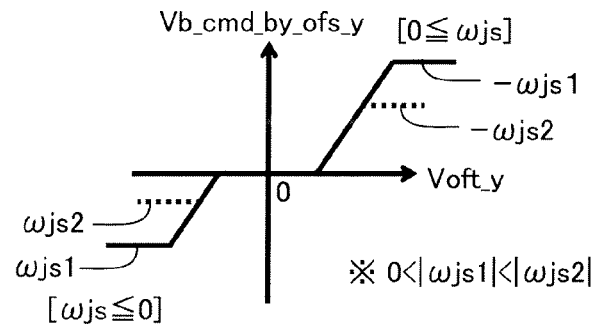
FIG. 12A is an explanatory chart of the setting map for a lateral travel velocity command based on the movement of the body weight.
Figure 12B:
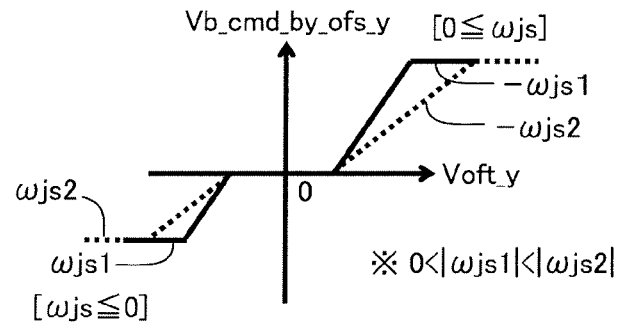
FIG. 12B is an explanatory chart of the setting map for the lateral travel velocity command based on the movement of the body weight.
Figure 12C:
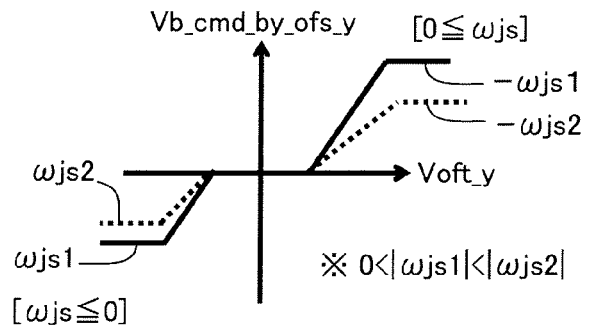
FIG. 12C is an explanatory chart of the setting map for the lateral travel velocity command based on the movement of the body weight.

FIG. 12A to FIG. 12C apply to the case where the turning direction of the vehicle 1 based on the basic turn angular velocity command ωjs and the direction of the lateral travel based on the center of gravity offset influence amount Vofs_y are opposite, i.e., the case where ωjs is a rightward angular velocity command (a negative angular velocity command) while Vofs_y is a leftward travel command, and the case where the ωjs is a leftward angular velocity command (a positive angular velocity command) while Vofs_y is a rightward travel command.

If the lateral travel velocity command based on Vofs_y is high in the case where the direction of turning of the vehicle 1 based on the basic turn angular velocity command ωjs and the direction of the lateral travel based on the center of gravity offset influence amount Vofs_y are opposite, then an undue velocity command for the electric motor 17 of the second travel operation unit 4 may result.

Therefore, according to the setting map of one of FIG. 12A to FIG. 12C, the lateral travel velocity command limiter 27 sets the desired center of gravity velocity addition amount Vb_cmd_by_ofs_y output with respect to the input of the center of gravity offset influence amount Vofs_y to a smaller value as the basic turn angular velocity command ωjs increases. For example, in the setting map of FIG. 10C, Vb_cmd_by_ofs_y with respect to the same Vost_y is set to become lower at ωjs2, −ωjs2 than at ωjs1, −ωjs1 (|ωjs1|<|ωjs2|) throughout the range excluding the dead zone.

This arrangement allows the vehicle 1 to turn within the speed limit range of the electric motor 17, thereby enabling the rider to easily accomplish the turning operation of the vehicle 1.

Figure 14A:
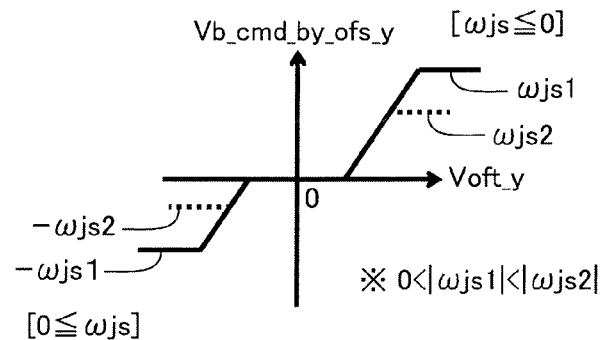
FIG. 14A is an explanatory chart of the setting map for the lateral travel velocity command based on the movement of the body weight.
Figure 14B:
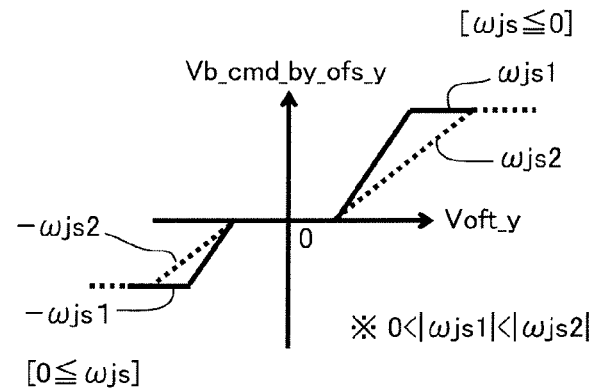
FIG. 14B is an explanatory chart of the setting map for the lateral travel velocity command based on the movement of the body weight.
Figure 14C:
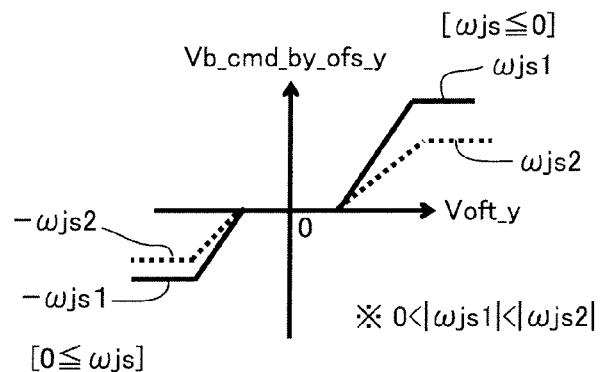
FIG. 14C is an explanatory chart of the setting map for the lateral travel velocity command based on the movement of the body weight.

FIG. 14A to FIG. 14C apply to the case where the turning direction of the vehicle 1 based on the basic turn angular velocity command ωjs and the lateral travel direction based on the center of gravity offset influence amount Vofs_y are the same, i.e., the case where ωjs is a rightward angular velocity command (the negative angular velocity command) and Vofs_y is a rightward travel command, and the case where the ωjs is a leftward angular velocity command (the positive angular velocity command) and Vofs_y is a leftward travel command.

If the lateral travel velocity command based on Vofs_y is high in the case where the turning direction of the vehicle 1 based on the basic turn angular velocity command ωjs and the lateral travel direction based on the center of gravity offset influence amount Vofs_y are the same, then the turn of the vehicle 1 may be hindered.

Therefore, according to the setting map of one of FIG. 14A to FIG. 14C, the lateral travel velocity command limiter 27 sets the desired center of gravity velocity addition amount Vb_cmd_by_ofs_y output with respect to the center of gravity offset influence amount Vofs_y to a smaller value as the basic turn angular velocity command ωjs increases. For example, in the setting map of FIG. 14C, Vb_cmd_by_ofs_y with respect to the same Vost_y is set to become lower at ωjs2, −ωjs2 than at ωjs1, −ωjs1 (|ωjs1|<|ωjs2|) throughout the range excluding the dead zone.

This arrangement gives priority to the turning operation of the vehicle 1, thus enabling the rider to easily accomplish the turning operation of the vehicle 1.

Subsequently, the center of gravity desired velocity determiner 32 carries out, by a processor 32d shown in FIG. 4, the processing for determining a desired velocity V1_xy obtained by adding each component of the desired center of gravity velocity addition amount Vb_cmd_by_ofs_xy to each component of the basic velocity command Vjs_xy determined by the operation command converter 31. More specifically, V1_xy (a set of V1_x and V1_y) is determined by the processing denoted by V1_x=Vjs_x+Vb_cmd_by_ofs_x and V1_y=Vjs_y+Vb_cmd_by_ofs_y.

Further, the center of gravity desired velocity determiner 32 carries out the processing by a processor 32e. The processor 32e carries out limiting for determining a restricted center of gravity desired velocity Vb_cmd_xy (a set of Vb_cmd_x and Vb_cmd_y) as a desired velocity of the vehicle system total center of gravity obtained by restricting the combination of desired velocities V1_x and V1_y in order to prevent the rotational speed of each of the electric motors 8a and 8b constituting the actuator 8 of the first travel operation unit 3 from deviating from a predetermined permissible range.

In this case, if the set of the desired velocities V1_x and V1_y determined by the processor 32d lies within a predetermined region (e.g., an octagonal region) on a coordinate system, in which the axis of ordinate indicates the value of the desired velocity V1_x and the axis of abscissa indicates the value of the desired velocity V1_y, then the desired velocity V1_xy is determined directly as the restricted center of gravity desired velocity Vb_cmd_xy.

Further, if the set of the desired velocities V1_x and V1_y determined by the processor 32d deviates from the predetermined region on the coordinate system, then a set that has been restricted to lie on the boundary of the predetermined region is determined as the restricted center of gravity desired velocity Vb_cmd_xy.

The longitudinal travel velocity command limiter 26 carries out, using a processor 32e, the processing for limiting the restricted center of gravity desired velocity in the X-axis direction (the longitudinal direction) Vb_cmd_x (corresponding to specifying the longitudinal travel velocity in the present invention), the Vb_cmd_x being set on the basis of the desired velocity V1_x (corresponding to the longitudinal travel operation in the present invention). As with the processor 31a in FIG. 7 described above, according to the same setting maps as the setting maps shown in FIG. 11A to FIG. 11C (maps in which the desired velocity V1_x is input and the restricted center of gravity desired velocity Vb_cmd_x is output), the longitudinal travel velocity command limiter 26 sets the restricted center of gravity desired velocity Vb_cmd_x output with respect to the input of the desired velocity V1_x to a lower value as the basic turn angular velocity command ωjs increases Further, the lateral travel velocity command limiter 27 carries out the processing for limiting the restricted center of gravity desired velocity in the Y-axis direction (the lateral direction) Vb_cmd_y, which is determined on the basis of the desired velocity V1_y (corresponding to the manipulated variable of the lateral travel operation in the present invention) obtained in the processor 32e by combining the basic velocity command Vjs_y and the desired center of gravity velocity addition amount Vb_cmd_by_ofs_y. The lateral travel velocity command limiter 27 changes the restricted center of gravity desired velocity Vb_cmd_y relative to the desired velocity V1_y on the basis of the basic turn angular velocity command ωjs according to the setting maps of the restricted center of gravity desired velocity Vb_cmd_y (output) with respect to the desired velocity V1_y (input) illustrated in FIG. 13A to FIG. 13C and FIG. 15A to FIG. 15C.

Figure 13A:
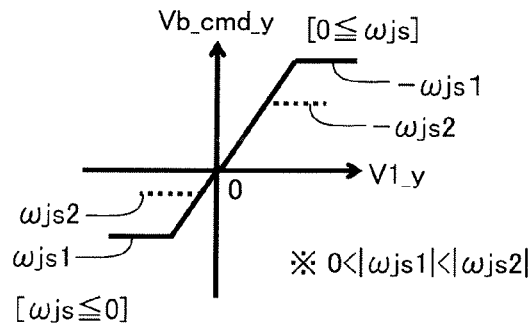
FIG. 13A is an explanatory chart of the setting map for the lateral travel velocity command based on a resultant velocity command.
Figure 13B:
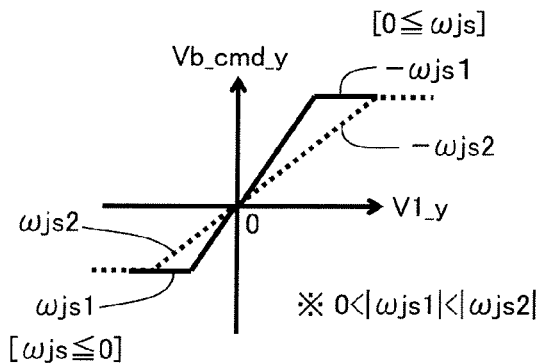
FIG. 13B is an explanatory chart of the setting map for the lateral travel velocity command based on the resultant velocity command.
Figure 13C:
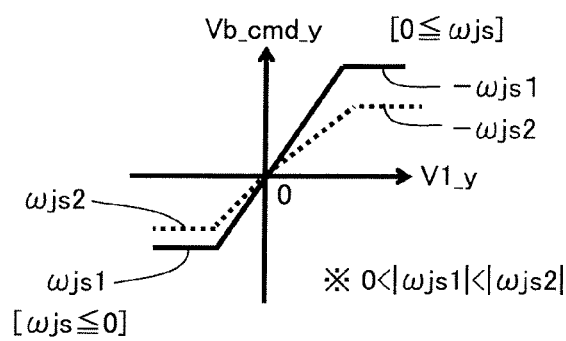
FIG. 13C is an explanatory chart of the setting map for the lateral travel velocity command based on the resultant velocity command.

FIG. 13A to FIG. 13C apply to the case where the direction of turning of the vehicle 1 based on the basic turn angular velocity command ωjs and the direction of the lateral travel based on the desired velocity V1_y are opposite, i.e., the case where ωjs is a rightward angular velocity command (the negative angular velocity command) while V1_y is a leftward travel command, and the case where the ωjs is a leftward angular velocity command (the positive angular velocity command) while V1_y is a rightward travel command.

If the lateral travel velocity command based on the desired velocity V1_y is high in the case where the direction of turning of the vehicle 1 based on the basic turn angular velocity command ωjs and the direction of the lateral travel based on the desired velocity V1_y are opposite, then an undue velocity command for the electric motor 17 of the second travel operation unit 4 may result.

Therefore, according to the setting map of one of FIG. 13A to FIG. 13C, the lateral travel velocity command limiter 27 sets the restricted center of gravity desired velocity Vb_cmd_y output with respect to the input of the desired velocity V1_y to a smaller value as the basic turn angular velocity command ωjs increases. For example, in the setting map of FIG. 13C, Vb_cmd_y with respect to the same V1_y is set to become lower at ωjs2, −ωjs2 than at ωjs1, −ωjs1 (|ωjs1|<|ωjs2|) throughout the range excluding the dead zone.

This arrangement allows the vehicle 1 to turn within the speed limit range of the electric motor 17, thereby enabling the rider to easily accomplish the turning operation of the vehicle 1.

Figure 15A:
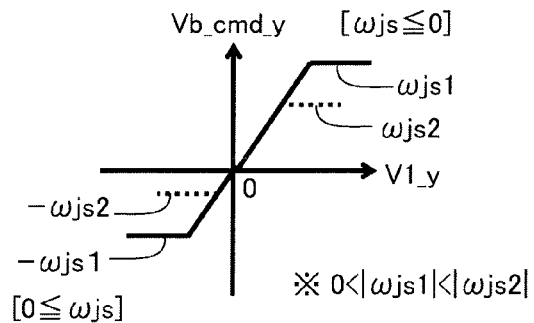
FIG. 15A is an explanatory chart of the setting map for the lateral travel velocity command based on the resultant velocity command.
Figure 15B:
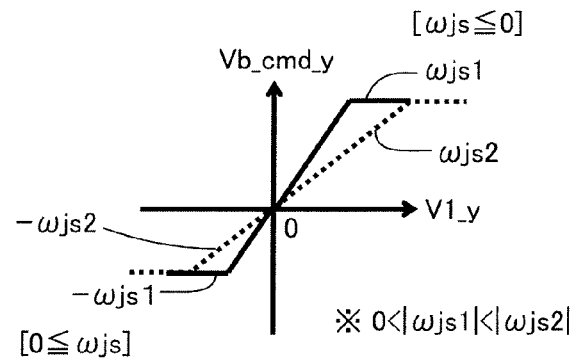
FIG. 15B is an explanatory chart of the setting map for the lateral travel velocity command based on the resultant velocity command.
Figure 15C:
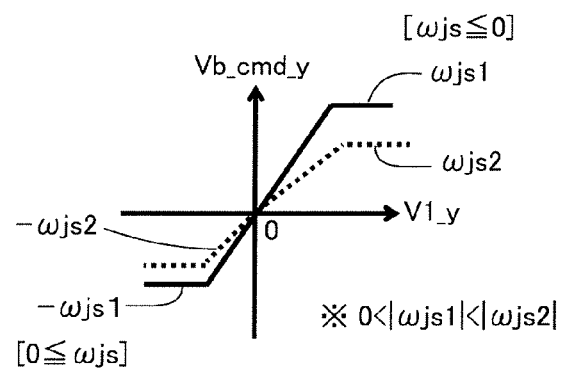
FIG. 15C is an explanatory chart of the setting map for the lateral travel velocity command based on the resultant velocity command.

FIG. 15A to FIG. 15C apply to the case where the turning direction of the vehicle 1 based on the basic turn angular velocity command ωjs and the direction of the lateral travel based on the desired velocity V1_y are the same, i.e., the case where ωjs is a rightward angular velocity command (the negative angular velocity command) and V1_y is a rightward travel command, and the case where the ωjs is a leftward angular velocity command (the positive angular velocity command) and V1_y is a leftward travel command.

If the lateral travel velocity command based on V1_y is high in the case where the direction of turning of the vehicle 1 based on the basic turn angular velocity command ωjs and the direction of the lateral travel based on the desired velocity V1_y are the same, then the turn of the vehicle 1 may be hindered.

Therefore, according to the setting map of one of FIG. 15A to FIG. 15C, the lateral travel velocity command limiter 27 sets the restricted center of gravity desired velocity Vb_cmd_y output with respect to the desired velocity V1_y to a smaller value as the basic turn angular velocity command ωjs increases. For example, in the setting map of FIG. 15C, Vb_cmd_y with respect to the same V1_y is set to become lower at ωjs2, −ωjs2 than at ωjs1, −ωjs1 (|ωjs1|<|ωjs2|) throughout the range.

This arrangement gives priority to the turning operation of the vehicle 1, thus enabling the rider to easily accomplish the turning operation of the vehicle 1.

The center of gravity desired velocity Vb_cmd_xy is determined on the basis of the basic velocity command Vjs_xy and the center of gravity offset influence amount Vofs_xy (or the center of gravity offset) as described above. This enables the rider to maneuver the vehicle 1 by operating the operation device, i.e., by operating the joystick 12, and by changing the posture of his/her body, i.e., by shifting his/her weight.

After carrying out the processing by the center of gravity desired velocity determiner 32, the first control processor 24 carries out the processing by the posture control arithmetic unit 34. The posture control arithmetic unit 34 carries out the processing illustrated by the block diagram of FIG. 4 to determine a first desired velocity Vw1_cmd_xy, which is the desired value of the travel velocity (translational velocity) of the first travel operation unit 3.

More specifically, the posture control arithmetic unit 34 first carries out, by the arithmetic unit 34b, the processing for subtracting each component of the center of gravity offset influence amount Vofs_xy from each component of the restricted center of gravity desired velocity Vb_cmd_xy, thereby determining a desired velocity with a compensated center of gravity offset Vb_cmpn_cmd_xy (a latest value).

Subsequently, according to expressions (4a) and (4b) given below, the posture control arithmetic unit 34 calculates a desired translational acceleration in the X-axis direction DVw1_cmd_x and a desired translational acceleration in the Y-axis direction DVw1_cmd_y of a desired translational acceleration DVw1_cmd_xy, which is the desired value of the translational acceleration at the ground contact point of the first travel operation unit 3, by carrying out the processing through the arithmetic units except for the arithmetic unit 34b and an integral arithmetic unit 34a, which carries out integral operations.

$$DVw1\_cmd\_x = Kvb\_x \cdot (Vb\_cmpn\_cmd\_x - Vb\_estm1\_x) - \quad (4a)$$
$$Kth\_x \cdot \theta b\_act\_x - Kw\_x \cdot \omega b\_act\_x$$

$$DVw1\_cmd\_y = Kvb\_y \cdot (Vb\_cmpn\_cmd\_y - Vb\_estm1\_y) - \quad (4b)$$
$$Kth\_y \cdot \theta b\_act\_y - Kw\_y \cdot \omega b\_act\_y$$

In expressions (4a) and (4b), Kvb_xy, Kth_xy and Kw_xy denote predetermined gain values set beforehand.

The first term of the right side of expression (4a) denotes a feedback manipulated variable component based on the difference between the compensated center of gravity-offset desired velocity in the X-axis direction Vb_cmpn_cmd_x (a latest value) of the vehicle system total center of gravity and a first estimated value Vb_estm1_x (a latest value), the second term thereof denotes a feedback manipulated variable component based on a measurement value (a latest value) of an actual tilt angle in the direction about the Y-axis θb_act_x of the rider mounting section 5, and the third term thereof denotes a feedback manipulated variable component based on a measurement value (a latest value) of an actual tilt angular velocity in the direction about the Y-axis ωb_act_x of the rider mounting section 5. Further, a desired translational acceleration in the X-axis direction DVw1_cmd_x is calculated as a resultant manipulated variable of the above feedback manipulated variable components.

Similarly, the first term of the right side of expression (4b) denotes a feedback manipulated variable component based on the difference between the compensated center of gravity-offset desired velocity in the Y-axis direction Vb_cmpn_c-md_y (a latest value) of the vehicle system total center of gravity and a first estimated value Vb_estm1_y (a latest value), the second term thereof denotes a feedback manipulated variable component based on a measurement value (a latest value) of an actual tilt angle in the direction about the X-axis θb_act_y of the rider mounting section 5, and the third term thereof denotes a feedback manipulated variable component based on a measurement value (a latest value) of an actual tilt angular velocity in the direction about the X-axis ωb_act_y of the rider mounting section 5. Further, a desired translational acceleration in the Y-axis direction DVw1_cmd_y is calculated as a resultant manipulated variable of the above feedback manipulated variable components.

Subsequently, the posture control arithmetic unit 34 integrates the components of the desired translational acceleration DVw1_cmd_xy by the integral arithmetic unit 34a, thereby determining a first desired velocity Vw1_cmd_xy (a latest value) of the first travel operation unit 3.

Then, the first control processor 24 controls the electric motors 8a and 8b constituting the actuator 8 of the first travel operation unit 3 according to the first desired velocity Vw1_cmd_xy determined as described above. More specifically, the first control processor 24 determines the current command values for the electric motors 8a and 8b by feedback control processing so as to make the actual rotational velocities (measurement values) of the electric motors 8a and 8b follow the desired values of the rotational velocities thereof specified by the first desired velocity Vw1_cmd_xy. The first control processor 24 then energizes the electric motors 8a and 8b according to the current command values. Thus, the configuration that controls the operation of the electric motors 8a and 8b of the first travel operation unit 3 according to the first desired velocity Vw1_cmd_xy corresponds to the control processing unit of the present invention.

Due to the processing described above, in a state wherein the restricted center of gravity desired velocity Vb_cmd_xy remains at a fixed value and the motion of the vehicle 1 has been stabilized after the aforesaid processing, i.e., in a state wherein the vehicle 1 is traveling in a straight line at a fixed velocity, the vehicle system total center of gravity lies right above the ground contact point of the first travel operation unit 3. In this state, the actual tilt angle θb_act_xy of the rider mounting section 5 will be −Ofst_xy/(h−r_xy) according to expressions (1b) and (2b). The actual tilt angular velocity ωb_act_xy of the rider mounting section 5 will be zero and the desired translational acceleration DVw1_cmd_xy will be zero. This combined with the block diagram of FIG. 4 lead to the finding of the agreement between Vb_estm1_xy and Vb_cmd_xy.

In other words, the first desired velocity Vw1_cmd_xy of the first travel operation unit 3 is basically determined to converge the difference between the restricted center of gravity desired velocity Vb_cmd_xy of the vehicle system total center of gravity and the first estimated value Vb_estm1_xy to zero.

Further, the rotational speeds of the electric motors 8a and 8b constituting the actuator 8 of the first travel operation unit 3 are controlled so as not to deviate from a predetermined permissible range by the processing carried out by the processor 32e while compensating for the influence on the deviation of the position of the vehicle system total center of gravity from the position of the reference portion Ps_xy in the inverted pendulum model.

This completes the detailed description of the processing by the first control processor 24 in the present embodiment.

The processing by the second control processor 25 will now be described with reference to FIG. 9. To summarize the processing by the second control processor 25, in a situation wherein the basic turn angular velocity ωjs determined by the operation command converter 31 is zero (in a situation wherein the swing amount in the Y-axis direction Js_y of the joystick 12 is zero or substantially zero), a second desired velocity Vw2_cmd_y, which is the desired value of the travel velocity (translational velocity) in the Y-axis direction of the second travel operation unit 4, is determined to coincide with a first desired velocity in the Y-axis direction Vw1_cmd_y of the first travel operation unit 3 in order to cause the vehicle 1 to perform a translational travel.

Further, in a situation wherein the basic turn angular velocity ωjs is not zero, the second control processor 25 determines the second desired velocity in the Y-axis direction Vw2_cmd_y of the second travel operation unit 4 to be different from the first desired velocity in the Y-axis direction Vw1_cmd_y of the first travel operation unit 3 in order to cause the vehicle 1 to turn.

Specifically, the processing by the second control processor 25 described above is carried out as follows. Referring to FIG. 9, the second control processor 25 first carries out, in a processor 41, the processing for limiting the basic turn angular velocity command ωjs by the turn velocity command limiter 28. The turn velocity command limiter 28 sets the limited turn angular velocity command ωjsc with respect to the basic turn angular velocity command ωjs on the basis of the desired value of the travel velocity in the X-axis direction (the longitudinal direction) Vw1_cmd_x according to the setting maps of the restricted turn angular velocity command ωjsc (output) relative to the basic turn angular velocity command ωjs (input) illustrated in FIG. 16A to FIG. 16C.

Figure 16A:
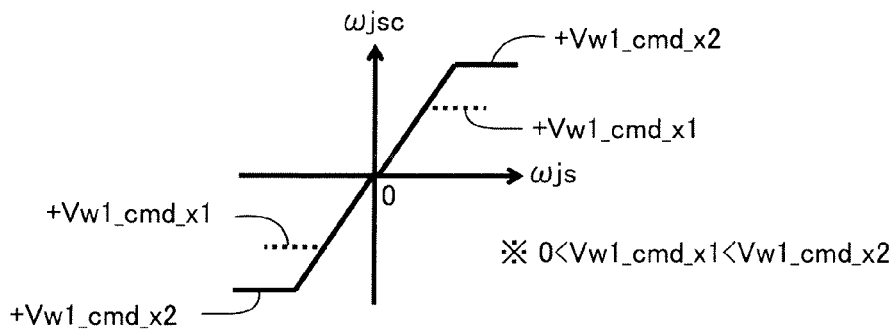
FIG. 16A is an explanatory chart of the setting map for a turn velocity command based on a longitudinal travel velocity.
Figure 16B:
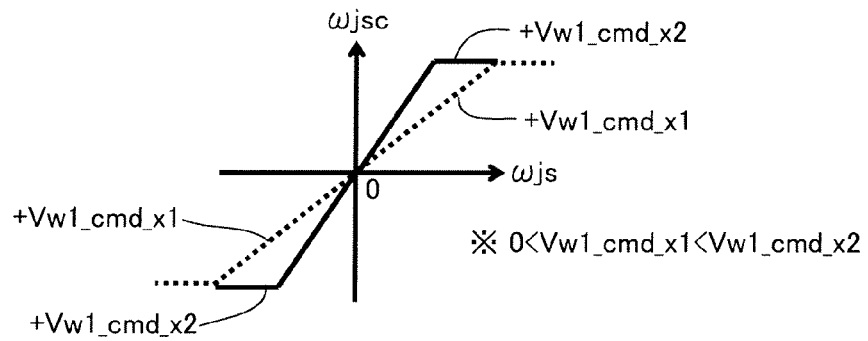
FIG. 16B is an explanatory chart of the setting map for the turn velocity command based on the longitudinal travel velocity.
Figure 16C:
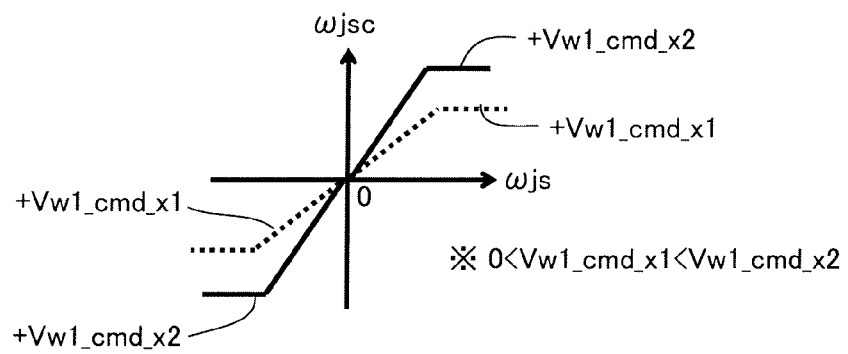
FIG. 16C is an explanatory chart of the setting map for the turn velocity command based on the longitudinal travel velocity.

According to the setting map in one of FIG. 16A to FIG. 16C, the turn velocity command limiter 28 sets the restricted turn angular velocity command ωjsc output with respect to the input of the basic turn angular velocity command ωjs to a lower value as the desired value of the travel velocity Vw1_cmd_x decreases. FIG. 16A to FIG. 16C illustrate the case where the desired value of the travel velocity Vw1_cmd_x is positive (the desired value indicating that the vehicle 1 is traveling forward). For example, in the setting map of FIG. 16C, ωjsc with respect to the same ωjs is set to become lower at +Vw1_cmd_x1 than at +Vw1_cmd_x2 (>+Vw1_cmd_x1) throughout the range.

This arrangement restrains a high-velocity turn angular velocity command from being issued when the desired value of the travel velocity Vw1_cmd_x indicating forward travel is low and the rider is trying to travel at a low speed.

Regarding the desired value of the travel velocity in the lateral direction Vw1_cmd_y, the restricted turn angular velocity command ωjsc output with respect to the input of the basic turn angular velocity command ωjs may be set to a lower value by the turn velocity command limiter 28 as Vw1_cmd_y increases (as the manipulated variable of the lateral travel operation increases). This gives priority to the travel of the vehicle 1 in the lateral direction when the restricted turn angular velocity command ωjsc is output within the range of the operation limit of the electric motor 17, thus enabling the rider to easily accomplish the operation for moving the vehicle 1 in the lateral direction.

Subsequently, the second control processor 25 carries out the processing by an arithmetic unit 42. The arithmetic unit 42 determines a basic relative velocity command Vjs2_y by multiplying the restricted turn angular velocity command ωjsc by a value that is −1 times the distance L in the X-axis direction (a predetermined value) between the first travel operation unit 3 and the second travel operation unit 4. The basic relative velocity command Vjs2_y is a command value of the relative velocity in the Y-axis direction of the second travel operation unit 4 in relation to the first travel operation unit 3 to cause the vehicle 1 to turn at the angular velocity of the restricted turn angular velocity command ωjsc.

Subsequently, the second control processor 25 carries out, through an arithmetic unit 43, the processing for adding the basic relative velocity command Vjs2_y (a latest value) to the first desired velocity in the Y-axis direction Vw1_cmd_y (a latest value) of the first travel operation unit 3 determined by the first control processor 24, thereby determining the second desired velocity in the Y-axis direction Vw2_cmd_y of the second travel operation unit 4.

Figure 9:
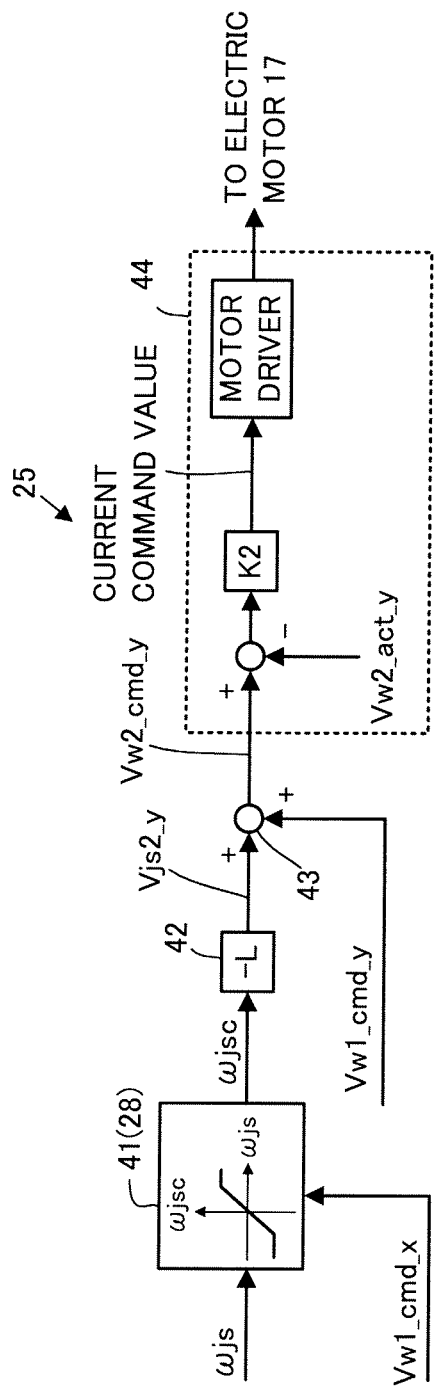
FIG. 9 is a block diagram illustrating the processing by a second control processor shown in FIG. 3.

Then, the second control processor 25 controls the current of the electric motor 17 serving as the second actuator (consequently the driving force of the second travel operation unit 4) such that the current actual travel velocity in the Y-axis direction Vw2_act_y of the second travel operation unit 4 follows the second desired velocity Vw2_cmd_y (a latest value), as illustrated in an arithmetic unit 44 of FIG. 9.

To be specific, the second control processor 25 determines a current command value Iw2_cmd of the electric motor 17 by carrying out the calculation of expression (5) given below. The second control processor 25 further controls the actual current of the electric motor 17 to Iw2_cmd by a motor driver.

$$Iw2\_cmd = K2 \cdot (Vw2\_cmd\_y - Vw2\_act\_y) \qquad (5)$$

In expression (5), K2 denotes a predetermined gain value set beforehand.

According to the present embodiment, a value estimated from a detection value of the rotational speed of the electric motor 17 (a detection value obtained by a rotational speed sensor, such as a rotary encoder, which is not shown) is used as the value of Vw2_act_y.

The difference between a desired value of the rotational speed of the electric motor 17 specified by Vw2_cmd_y and the detection value of the rotational speed may be used in place of Vw2_cmd_y−Vw2_act_y of expression (5).

In the situation wherein the turn command is not being output from the joystick 12 (the situation in which the basic turn angular velocity command ωjs is zero), the second desired velocity Vw2_cmd_y is determined such that it agrees with the first desired velocity in the Y-axis direction Vw1_cmd_y (a latest value) of the first travel operation unit 3 by the control processing carried out by the second control processor 25 described above.

Further, in the situation wherein the turn command is being output from the joystick 12 (in the situation wherein the basic turn angular velocity command ωjs is not zero), the second desired velocity Vw2_cmd is determined to be a value obtained by adding the basic relative velocity command Vjs2_y (a latest value) determined on the basis of the basic turn angular velocity command ωjs to the first desired velocity Vw1_cmd_y in the Y-axis direction (a latest value) of the first travel operation unit 3. In other words, the second desired velocity Vw2_cmd_y is determined to agree with Vw1_cmd_y+Vjs2_y.

Therefore, the second desired velocity Vw2_cmd_y is determined to take a velocity value that is different from the first desired velocity in the Y-axis direction Vw1_cmd_y of the first travel operation unit 3 such that the vehicle 1 turns.

More specifically, if the turn command from the joystick 12 is a command for turning the vehicle 1 to the right side (in the right-hand turning), i.e., if ωjs is an angular velocity in the clockwise direction, then the basic relative velocity command Vjs2_y will be a leftward velocity.

At this time, if the first desired velocity in the Y-axis direction Vw1_cmd_y of the first travel operation unit 3 is the leftward velocity, then the second desired velocity in the Y-axis direction Vw2_cmd_y of the second travel operation unit 4 will be a leftward velocity having a magnitude that is larger than that of Vw1_cmd_y.

In the case where the turn command from the joystick 12 is a command for turning the vehicle 1 to the right (the right-hand direction), if the first desired velocity in the Y-axis direction Vw1_cmd_y of the first travel operation unit 3 is a rightward velocity, then the second desired velocity in the Y-axis direction Vw2_cmd_y of the second travel operation unit 4 will be a rightward velocity having a magnitude that is smaller than that of Vw1_cmd_y or a velocity in the opposite direction from that of Vw1_cmd_y, i.e., the leftward direction.

Meanwhile, if the turn command from the joystick 12 is a command for turning the vehicle 1 to the left (left-hand direction), i.e., if ωjs is an angular velocity in the counterclockwise direction, then the basic relative velocity command Vjs2_y will be a rightward velocity.

At this time, if the first desired velocity in the Y-axis direction Vw1_cmd_y of the first travel operation unit 3 is the rightward velocity, then the second desired velocity in the Y-axis direction Vw2_cmd_y of the second travel operation unit 4 will be a rightward velocity having a magnitude that is larger than that of Vw1_cmd_y.

In the case where the turn command from the joystick 12 is a command for turning the vehicle 1 to the left (the left-hand direction), if the first desired velocity in the Y-axis direction Vw1_cmd_y of the first travel operation unit 3 is a leftward velocity, then the second desired velocity in the Y-axis direction Vw2_cmd_y of the second travel operation unit 4 will be a leftward velocity having a magnitude that is smaller than that of Vw1_cmd_y or a velocity in the opposite direction from that of Vw1_cmd_y, i.e., the rightward direction.

This completes the detailed description of the processing carried out by the second control processor 25.

The configuration for outputting the basic turn angular velocity command ωjs and the basic velocity command Vjs_xy by the operation command converter 31 and the configuration for outputting the desired center of gravity velocity addition amount Vb_cmd_by_ofs_xy and the restricted center of gravity desired velocity Vb_cmd_xy by the center of gravity offset estimator 35*a*, the center of gravity offset influence amount calculator 35*b* and the center of gravity desired velocity determiner constitute the velocity command output unit in the present invention.

Further, the configuration in which the first control processor 24 controls the energization of the electric motors 8*a* and 8*b* of the first travel operation unit 3 and the second control processor 25 controls the energization of the electric motor 17 of the second travel operation unit 4 corresponds to the control processing unit in the present invention.

The vehicle 1 according to the present embodiment described above enables the translational travel of the vehicle 1 in the X-axis direction to be accomplished in response to a longitudinal tilt (in the X-axis direction) of the rider mounting section 5 (or the base body 2) caused by the movement of the body of the rider on the rider mounting section 5 or in response to the operation of swinging the joystick 12 in the longitudinal direction.

The translational travel of the vehicle 1 in the Y-axis direction can be also accomplished in response to a lateral tilt (in the Y-axis direction) of the rider mounting section 5 (or the base body 2).

Further, combining the aforesaid translational travels enables the vehicle 1 to translationally travel in an arbitrary direction at an angle relative the X-axis direction and the Y-axis direction.

A turn (the change of direction) of the vehicle 1 can be also made to the right or left side of the vehicle 1 specified by a turn command by setting the traveling velocities in the Y-axis direction of the first travel operation unit 3 and the second travel operation unit 4 to different values according to a turn command output in response to the operation of swinging the joystick 12 in the lateral direction.

Thus, the translational travel and the turn of the vehicle 1 can be easily made without the need for a complicated operation of an operation device, such as the joystick 12, or a complicated motion of the body of a rider.

When the vehicle 1 is stationary or in other situations wherein the travel velocity in the Y-axis direction of the first travel operation unit 3 is zero or substantially zero (i.e., when the first desired velocity Vw1_cmd_y is zero or substantially zero), if the rider swings the joystick 12 in the lateral direction to turn the vehicle 1, then the basic velocity command Vjs_y, which is the velocity component in the Y-axis direction based on the swing amount of the joystick 12 in the lateral direction, will be added to a desired velocity applied in the case where it is assumed that there has been no operation of swinging the joystick 12 in the lateral direction, thus providing the desired velocity Vb_cmd_xy of the vehicle system total center of gravity, which is the representative point of the vehicle 1.

If the turn command from the joystick 12 is the command for turning the vehicle 1 to the left (the left-hand direction), then the velocity component Vjs_y will be a rightward velocity. If the turn command from the joystick 12 is the command for turning the vehicle 1 to the right (the right-hand direction), then the velocity component Vjs_y will be a leftward velocity.

Basically, therefore, the first desired velocity in the Y-axis direction Vw1_cmd_y of the first travel operation unit 3 and the second desired velocity in the Y-axis direction Vw2_cmd_y of the second travel operation unit 4 are set such that they are velocities in the same direction, while the magnitude of Vw2_cmd_y is greater than that of Vw1_cmd_y.

Thus, the turn (the change of direction) of the vehicle 1 in response to the operation of swinging the joystick 12 in the lateral direction is made such that the vehicle 1 rotates in the direction about the yaw axis at each instant during the turn, using an instantaneous turn center in a front region of the ground contact surface of each of the first travel operation unit 3 and the second travel operation unit 4 as the rotational center.

As a result, the rider on the rider mounting section 5 easily senses the turning behavior of the vehicle 1. This enables the rider of the vehicle 1 to operate the joystick 12 to obtain a desired turning behavior by properly recognizing the turning behavior of the vehicle 1.

Further, if, for example, the turn command is output from the joystick 12 in the situation wherein the first desired velocity Vw1_cmd_xy of the first travel operation unit 3 has been set to zero or substantially zero, then a velocity command for turning (≠0) is set as the basic velocity command in the Y-axis direction Vjs_y related to the first travel operation unit 3. This enables the vehicle 1 to turn by moving the first travel operation unit 3 in the Y-axis direction.

Thus, the frictional force between the first travel operation unit 3 and the floor surface is reduced, permitting a smooth turn of the vehicle 1.

Further, in the present embodiment, the center of gravity offset estimator 35a of the first control processor 24 estimates the center of gravity offset amount Ofst_xy of the vehicle system total center of gravity by the processing illustrated in FIG. 8. Hence, the center of gravity offset amount can be accurately estimated. Then, based on the estimated value Ofst_estm_xy of the center of gravity offset amount Ofst_xy, the desired velocity of the vehicle system total center of gravity (the restricted center of gravity desired velocity) Vb_cmd_xy is determined as described above. This allows the center of gravity offset amount Ofst_xy to properly compensate for the influence exerted on the behavior of the vehicle 1.

Further, in the vehicle 1 according to the present embodiment, the swing amount (the swing amount in the direction about the Y-axis) of the second travel operation unit 4 relative to the base body 2 is mechanically restricted to the predetermined range defined by the stoppers 16 and 16, thereby making it possible to prevent, in particular, the rider mounting section 5, from excessively leaning to the rear, which would cause the rider the inconvenience of poor visibility.

Several modified forms of the aforesaid embodiments will now be described.

In the embodiments described above, the joystick 12 has been used as the operation device for outputting turn commands and the like; however, a trackball or a touch-pad may be used in place of a joystick. Alternatively, a load sensor adapted to detect a place that comes in contact with a rider or a posture sensor held by a rider may be used instead of the joystick.

Further, the second travel operation unit 4 in the aforesaid embodiment has been the omniwheel formed of a pair of annular core members and a plurality of rollers 13 externally inserted therein. Alternatively, however, the second travel operation unit 4 may be constituted of a single annular core member and a plurality of rollers externally inserted therein. The second travel operation unit 4 may further alternatively have, for example, the same construction as that of the first travel operation unit 3, instead of using the omniwheel.

Further, in the present embodiment, the ground contact point velocity has been calculated on the basis of the detection signals of the acceleration sensor 50 and the angular velocity sensor 51. Alternatively, however, the ground contact point velocity may be detected by using other types of sensors.

Further, in the present embodiment, the longitudinal travel velocity has been limited by the longitudinal travel velocity command limiter 26, the lateral travel velocity has been limited by the lateral travel velocity command limiter 27, and the turn velocity has been limited by the turn velocity command limiter 28; however, the advantages of the present invention can be obtained by limiting at least one of the longitudinal travel velocity, the lateral travel velocity and the turn velocity.

What is claimed is:

1. An inverted pendulum vehicle comprising:
   a first travel operation unit capable of traveling on a floor surface;
   a first actuator that drives the first travel operation unit;
   a base body to which the first travel operation unit and the first actuator are installed; and
   a rider mounting section attached to the base body such that the rider mounting section is tiltable relative to a vertical direction, wherein the first travel operation unit is configured to be capable of traveling in all directions on the floor surface, including a longitudinal direction and a lateral direction relative to a rider on the rider mounting section, by a driving force of the first actuator, the inverted pendulum vehicle comprising:

a second travel operation unit, which is connected to the first travel operation unit or the base body with an interval provided from the first travel operation unit in the longitudinal direction and which is configured to be capable of traveling in all directions on the floor surface;

a second actuator which generates a driving force for causing the second travel operation unit to travel at least in the lateral direction;

an operation unit which receives, from a rider on the rider mounting section, a longitudinal travel operation instruction for a travel of the inverted pendulum vehicle in the longitudinal direction, a lateral travel operation instruction for a travel of the inverted pendulum vehicle in the lateral direction, and a turn operation instruction for making a turn of the inverted pendulum vehicle;

a velocity command output unit which outputs a longitudinal travel velocity command for causing the inverted pendulum vehicle to travel in the longitudinal direction at a command velocity based on a manipulated variable of the longitudinal travel operation, a lateral travel velocity command for causing the inverted pendulum vehicle to travel in the lateral direction at a command velocity based on a manipulated variable of the lateral travel operation, and a turn velocity command for causing the inverted pendulum vehicle to turn at a command velocity based on a manipulated variable of the turn operation;

a control processing unit which controls the traveling operations of the first travel operation unit and the second travel operation unit by operating the first actuator and the second actuator according to the longitudinal travel velocity command, the lateral travel velocity command, and the turn velocity command; and a turn velocity command limiting unit which sets the turn velocity command based on the turn operation to be lower as the manipulated variable of the longitudinal travel operation decreases while the turn operation and the longitudinal travel operation are being performed through the operation unit.

2. An inverted pendulum vehicle comprising:
a first travel operation unit capable of traveling on a floor surface;
a first actuator that drives the first travel operation unit;
a base body to which the first travel operation unit and the first actuator are installed; and
a rider mounting section attached to the base body such that the rider mounting section is tiltable relative to a vertical direction,
wherein the first travel operation unit is configured to be capable of traveling in all directions on the floor surface, including a longitudinal direction and a lateral direction relative to a rider on the rider mounting section, by a driving force of the first actuator, the inverted pendulum vehicle comprising:
a second travel operation unit, which is connected to the first travel operation unit or the base body with an interval provided from the first travel operation unit in the longitudinal direction and which is configured to be capable of traveling in all directions on the floor surface;
a second actuator which generates a driving force for causing the second travel operation unit to travel at least in the lateral direction;
an operation unit which receives, from a rider on the rider mounting section, a longitudinal travel operation instruction for a travel of the inverted pendulum vehicle in the longitudinal direction, a lateral travel operation instruction for a travel of the inverted pendulum vehicle in the lateral direction, and a turn operation instruction for making a turn of the inverted pendulum vehicle;
a velocity command output unit which outputs a longitudinal travel velocity command for causing the inverted pendulum vehicle to travel in the longitudinal direction at a command velocity based on a manipulated variable of the longitudinal travel operation, a lateral travel velocity command for causing the inverted pendulum vehicle to travel in the lateral direction at a command velocity based on a manipulated variable of the lateral travel operation, and a turn velocity command for causing the inverted pendulum vehicle to turn at a command velocity based on a manipulated variable of the turn operation;
a control processing unit which controls the traveling operations of the first travel operation unit and the second travel operation unit by operating the first actuator and the second actuator according to the longitudinal travel velocity command, the lateral travel velocity command, and the turn velocity command; and
a turn velocity command limiting unit which sets the turn velocity command based on the turn operation to be lower as the manipulated variable of the lateral travel operation increases while the turn operation and the lateral travel operation are being performed through the operation unit.

3. An inverted pendulum vehicle comprising:
a first travel operation unit capable of traveling on a floor surface;
a first actuator that drives the first travel operation unit;
a base body to which the first travel operation unit and the first actuator are installed; and
a rider mounting section attached to the base body such that the rider mounting section is tiltable relative to a vertical direction,
wherein the first travel operation unit is configured to be capable of traveling in all directions on the floor surface, including a longitudinal direction and a lateral direction relative to a rider on the rider mounting section, by a driving force of the first actuator, the inverted pendulum vehicle comprising:
a second travel operation unit, which is connected to the first travel operation unit or the base body with an interval provided from the first travel operation unit in the longitudinal direction and which is configured to be capable of traveling in all directions on the floor surface;
a second actuator which generates a driving force for causing the second travel operation unit to travel at least in the lateral direction;
an operation unit which receives, from a rider on the rider mounting section, a longitudinal travel operation instruction for a travel of the inverted pendulum vehicle in the longitudinal direction, a lateral travel operation instruction for a travel of the inverted pendulum vehicle in the lateral direction, and a turn operation instruction for making a turn of the inverted pendulum vehicle;
a velocity command output unit which outputs a longitudinal travel velocity command for causing the inverted pendulum vehicle to travel in the longitudinal direction at a command velocity based on a manipulated variable of the longitudinal travel operation, a lateral travel velocity command for causing the inverted pendulum vehicle to travel in the lateral direction at a command velocity based on a manipulated variable of the lateral travel operation, and a turn velocity command for causing the inverted pendulum vehicle to turn at a command velocity based on a manipulated variable of the turn operation;

a control processing unit which controls the traveling operations of the first travel operation unit and the second travel operation unit by operating the first actuator and the second actuator according to the longitudinal travel velocity command, the lateral travel velocity command, and the turn velocity command; and a lateral travel velocity command limiting unit which sets the lateral travel velocity command to be lower as the manipulated variable of the turn operation increases while the turn operation and the lateral travel operation are being performed through the operation unit.

* * * * *